(12) United States Patent
Burian et al.

(10) Patent No.: US 7,207,602 B2
(45) Date of Patent: Apr. 24, 2007

(54) CLAMP ASSEMBLY

(75) Inventors: William F. Burian, Downers Grove, IL (US); Alex V. Degutis, East Chicago, IN (US); Charles Lonnie Horne, Chicago, IL (US); James M. McLaughlin, Monee, IL (US); Michael S. Ryan, Darien, IL (US); Clayton Strand, Bolingbrook, IL (US); Craig H. Leighton, Aurora, IL (US)

(73) Assignee: Salco Products, Inc., Lemont, IL (US)

( * ) Notice: Subject to any disclaimer, the term of this patent is extended or adjusted under 35 U.S.C. 154(b) by 286 days.

(21) Appl. No.: 10/640,941

(22) Filed: Aug. 14, 2003

(65) Prior Publication Data

US 2004/0108484 A1 Jun. 10, 2004

Related U.S. Application Data

(63) Continuation-in-part of application No. 10/278,573, filed on Oct. 22, 2002, now Pat. No. 6,607,177, which is a continuation-in-part of application No. 10/014,396, filed on Oct. 26, 2001, now Pat. No. 6,616,123.

(51) Int. Cl.
*F16L 3/00* (2006.01)
(52) U.S. Cl. .................. 285/24; 285/133.11; 248/62
(58) Field of Classification Search ............. 285/24, 285/272, 145.1, 145.2, 145.4, 133.11; 248/58, 248/62, 72
See application file for complete search history.

(56) References Cited

U.S. PATENT DOCUMENTS

| 144,997 | A | 11/1873 | Mayall |
| 1,093,868 | A | 4/1914 | Leighty |
| 1,877,391 | A * | 9/1932 | De Bence .................. 248/58 |
| 2,395,745 | A | 2/1946 | King |

(Continued)

FOREIGN PATENT DOCUMENTS

CH 674253 5/1990

(Continued)

*Primary Examiner*—David Bochna
(74) *Attorney, Agent, or Firm*—Leydig, Voit & Mayer, Ltd.

(57) ABSTRACT

A clamp assembly for connecting the end of a first pipe to the end of an axially aligned second pipe. The clamp assembly comprises a first semi-circular clamp arm, a second semi-circular clamp arm, a lever and a latch. The first clamp arm has a first end portion and a second end portion. The second clamp arm has a first end portion and a second end portion. The first end portion of the second clamp arm is pivotably attached to the first end portion of the first clamp arm. The lever is pivotably attached to the first end portion of the first clamp arm. The latch has a first end portion and a second end portion. The first end portion of the latch is pivotably attached the second end portion of the second clamp arm. The second end portion of the latch is attached to the lever upon the clamp assembly in a closed position. The distance between the attachment of the latch to the second clamp arm to the attachment of the latch to the lever is adjustable in the attachment of the latch to the second clamp arm.

7 Claims, 17 Drawing Sheets

U.S. PATENT DOCUMENTS

| | | |
|---|---|---|
| 3,042,430 A | 7/1962 | Guy |
| 3,201,906 A * | 8/1965 | Giardina ............... 248/58 |
| 4,272,871 A | 6/1981 | Weinhold |
| 4,561,678 A | 12/1985 | Kunsman |
| 5,104,153 A | 4/1992 | Corcoran |
| 5,540,465 A | 7/1996 | Sisk |
| 5,722,666 A | 3/1998 | Sisk |
| 5,842,681 A * | 12/1998 | Sisk ................. 251/144 |
| 6,213,449 B1 | 4/2001 | Portis et al. |
| 6,470,538 B2 | 10/2002 | Richter |
| 6,517,030 B2 * | 2/2003 | Heath ................... 248/62 |
| 6,582,160 B2 * | 6/2003 | Campbell et al. ....... 406/131 |

FOREIGN PATENT DOCUMENTS

| | | |
|---|---|---|
| JP | 211992 | 2/1990 |

* cited by examiner

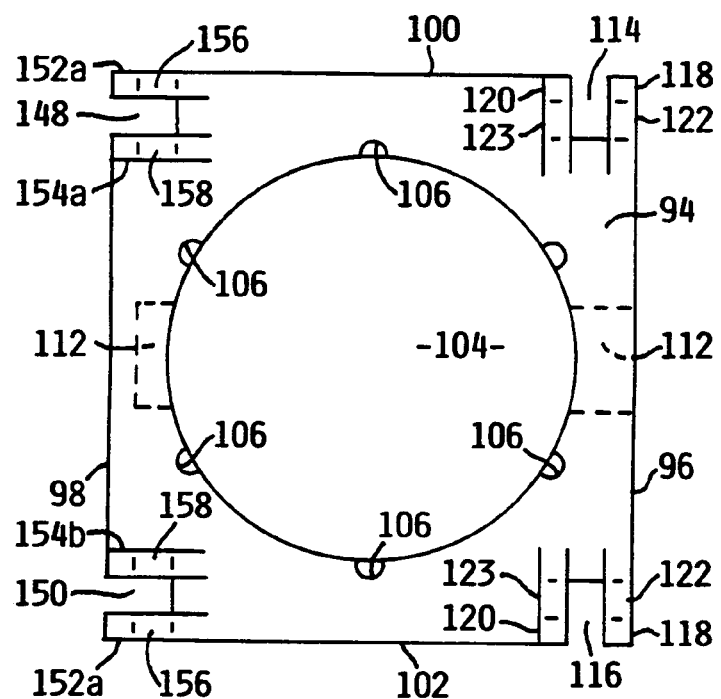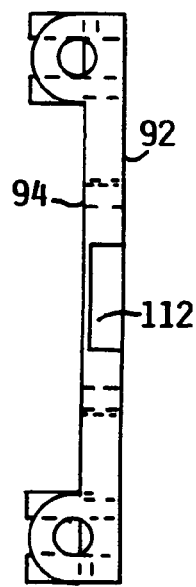
FIG. 6      FIG. 7
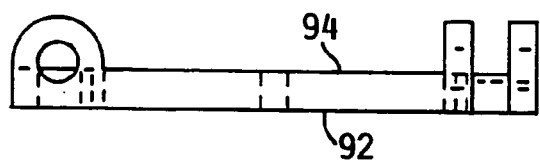
FIG. 8

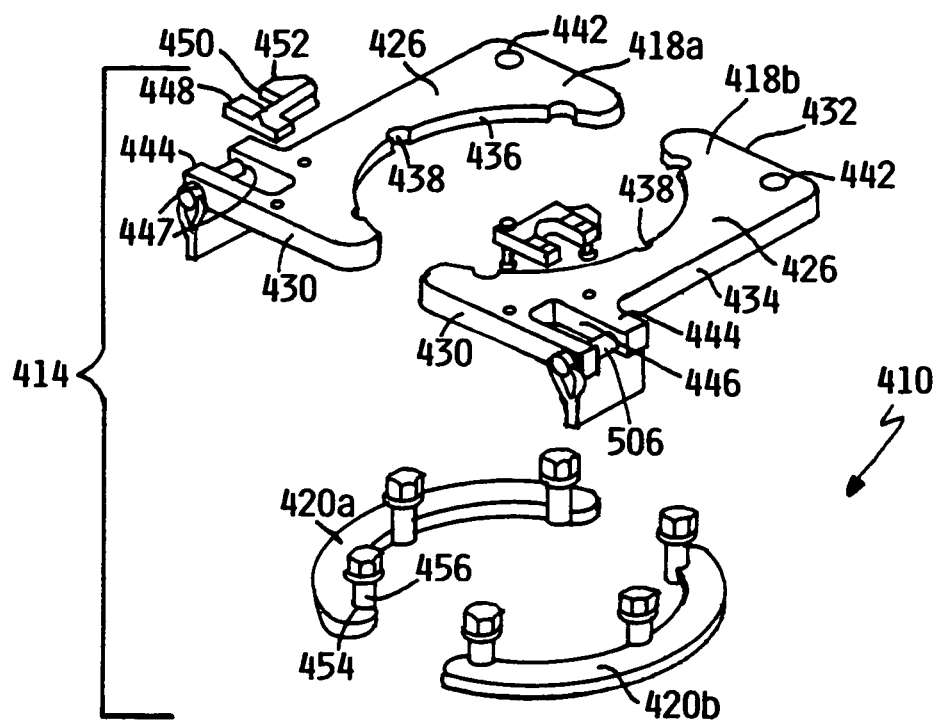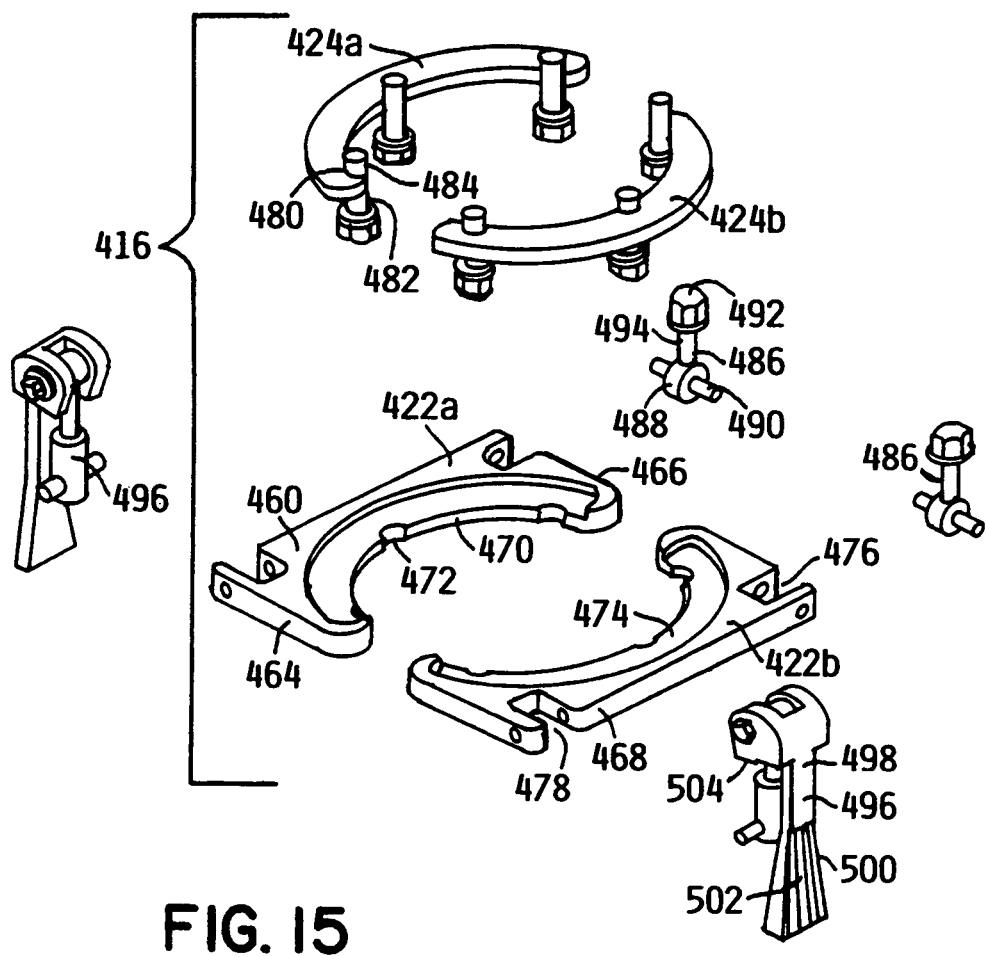
FIG. 15

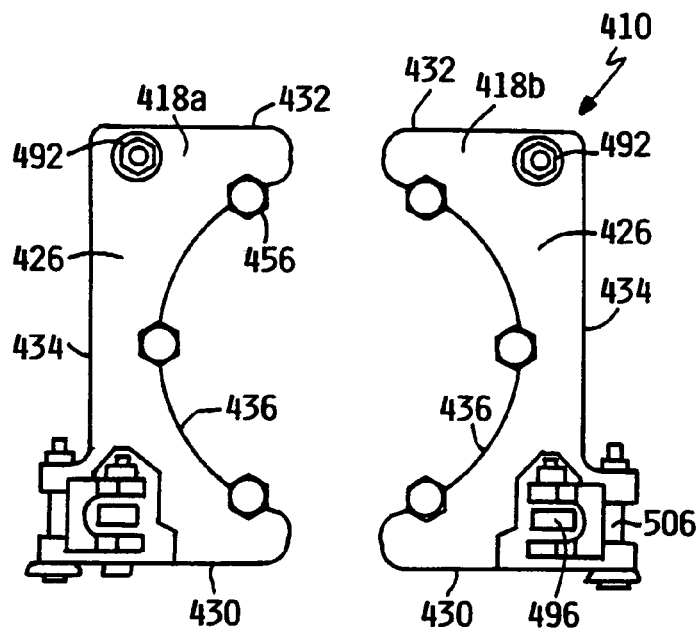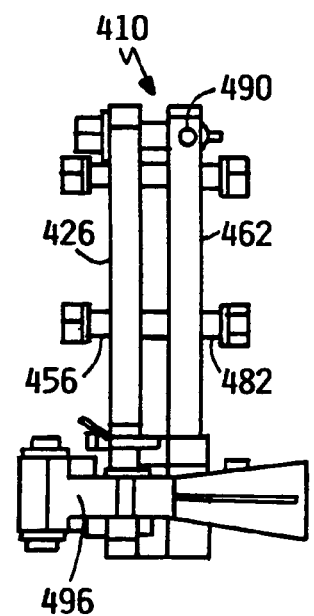
FIG. 16　　　　　FIG. 17
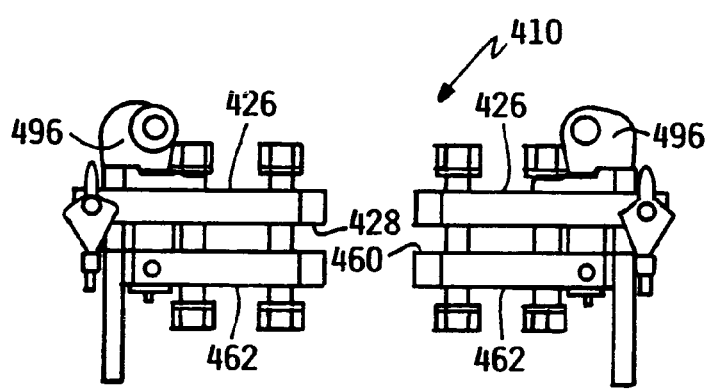
FIG. 18

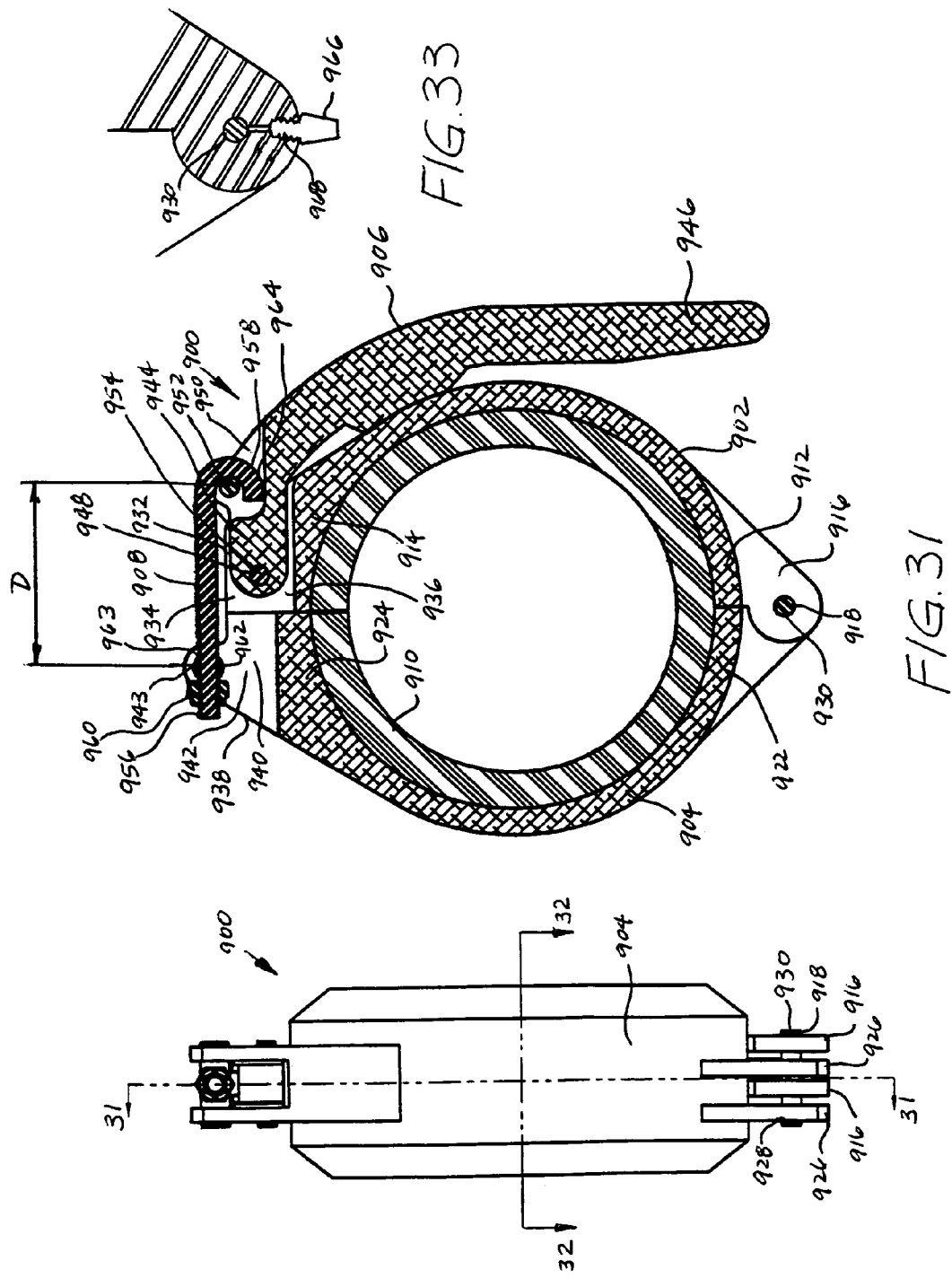

CLAMP ASSEMBLY

This application is a continuation-in-part of application Ser. No. 10/278,573 filed Oct. 22, 2002, now U.S. Pat. No. 6,607,177, which is a continuation-in-part of application Ser. No. 10/014,396 filed Oct. 26, 2001, now U.S. Pat. No. 6,616,123. This application is also a continuation-in-part of application Ser. No. 10/014,396 filed Oct. 26, 2001. The present invention relates to a clamp assembly for connecting the end of a first pipe to the end of an axially aligned second pipe. More specifically, it relates to a clamp assembly for connecting the end of a hopper tee to the end of an axially aligned second pipe.

BACKGROUND OF THE INVENTION

Hopper or tank trailers are commonly used to transport dry bulk such as industrial and food products. The trailer has a plurality of funnel shaped hoppers located at the bottom of the trailer. Defined at the lower most end of each hopper is a discharge outlet. Attached to each discharge outlet is a valve member and a hopper tee. The hopper tee has a vertical section and a horizontal section forming the tee configuration. The valve member is located between the discharge end of the hopper and the top of the hopper tee. A plurality of connection pipes are connected the horizontal sections of the hopper tees to allow the dry bulk to be discharged from a single discharge opening.

When the hopper trailer reaches its destination, the dry bulk is unloaded. The unloading process involves attaching a discharge pipe to the discharge opening of the trailer. The valve members are then positioned to the opened position such that the dry bulk is able to flow freely into the hopper tees. Thereafter, a reduced pressure in the discharge pipe suctions the dry bulk through the bottom lines and into the discharge pipe.

Although the prior art hopper tee assemblies function well for their intended purposes, there are several problems associated with the prior art valve member and hopper tee assemblies. The prior art valve member and the hopper tee assemblies are bolted to a flange located at the bottom of the hopper. To gain access to the valve member or the interior of the hopper tee, a wrench must be used to unbolt the bolts that hold the hopper tee and the valve member to the flange. The process of unbolting the bolts is very time consuming.

U.S. Pat. No. 5,842,681 to Sisk addresses the concern of having to remove the bolts to gain access to the valve member or the interior of the hopper tee, by replacing the conventional flange, the valve member and the hopper tee with a swing-away hopper tee assembly. While the '681 Sisk hopper assembly can be easily opened without the necessity of unbolting, the '681 Sisk hopper assembly is significantly taller than the conventional valve member and hopper tee which it replaces. Therefore, to retrofit a trailer with the '681 Sisk hopper assembly, the bottom of each hopper would need to be reduced to accommodate for the increased height of the Sisk hopper assembly. Such a retrofitting process is very time consuming and costly.

As discussed previously, a plurality of connection pipes are connected the horizontal sections of the hopper tees. A vacuum is sometimes employed through the connection pipes to facilitate the emptying of the dry bulk material. All of the dry bulk product must be removed at the end of unloading process to prevent contamination of subsequent loads. It is known that contamination can occur at the point of coupling of the connection pipe and the hopper tee. Hence, it may sometimes be necessary to remove the clamp assembly connecting the hopper tee to the corresponding connection pipe and unseat the gasket to gain access to the junction between the hopper tee and the connection pipe. It is known in the prior art to use a clamp assembly having semi-circular arms connected by a hinge. A lever and a clamping means is used to draw the two arms tightly together to surround a gasket situated radially outwardly of the junction between the hopper tee and corresponding connection pipe. U.S. Pat. No. 5,722,666 discloses such a clamp assembly. While the clamp assembly disclosed in the '666 Patent allows for quick removal of the clamp assembly; to gain access to the junction between the hopper tee and the corresponding connection pipe, a further step is still required to unseat the gasket by sliding the gasket along the hopper tee or the connection pipe.

Therefore, there exists a need for a clamp assembly which allows for easy access to the junction between the hopper tee and the corresponding connection pipe.

BRIEF DESCRIPTION OF THE DRAWINGS

FIG. 6 is a bottom view of a lower plate of the hopper tee mounting assembly of FIG. 1;

FIG. 7 is a front view of the lower plate of FIG. 6;

FIG. 8 is a side view of the lower plate of FIG. 6;

FIG. 15 is a perspective view of a hopper tee mounting assembly, in accordance to a third embodiment of the present invention;

FIG. 16 is a top view of the hopper tee mounting assembly of FIG. 15;

FIG. 17 is a side view of the hopper tee mounting assembly of FIG. 15;

FIG. 18 is a front view of the hopper tee mounting assembly of FIG. 15;

FIG. 30 is a front view of the clamp assembly of FIG. 24;

FIG. 31 is a sectional view of the clamp assembly of FIG. 30, as taken along line 31—31;

FIG. 33 is an enlarged sectional side view of an alternative clamp assembly in accordance to the present invention.

DETAILED DESCRIPTION OF THE EMBODIMENTS

Figure 1:
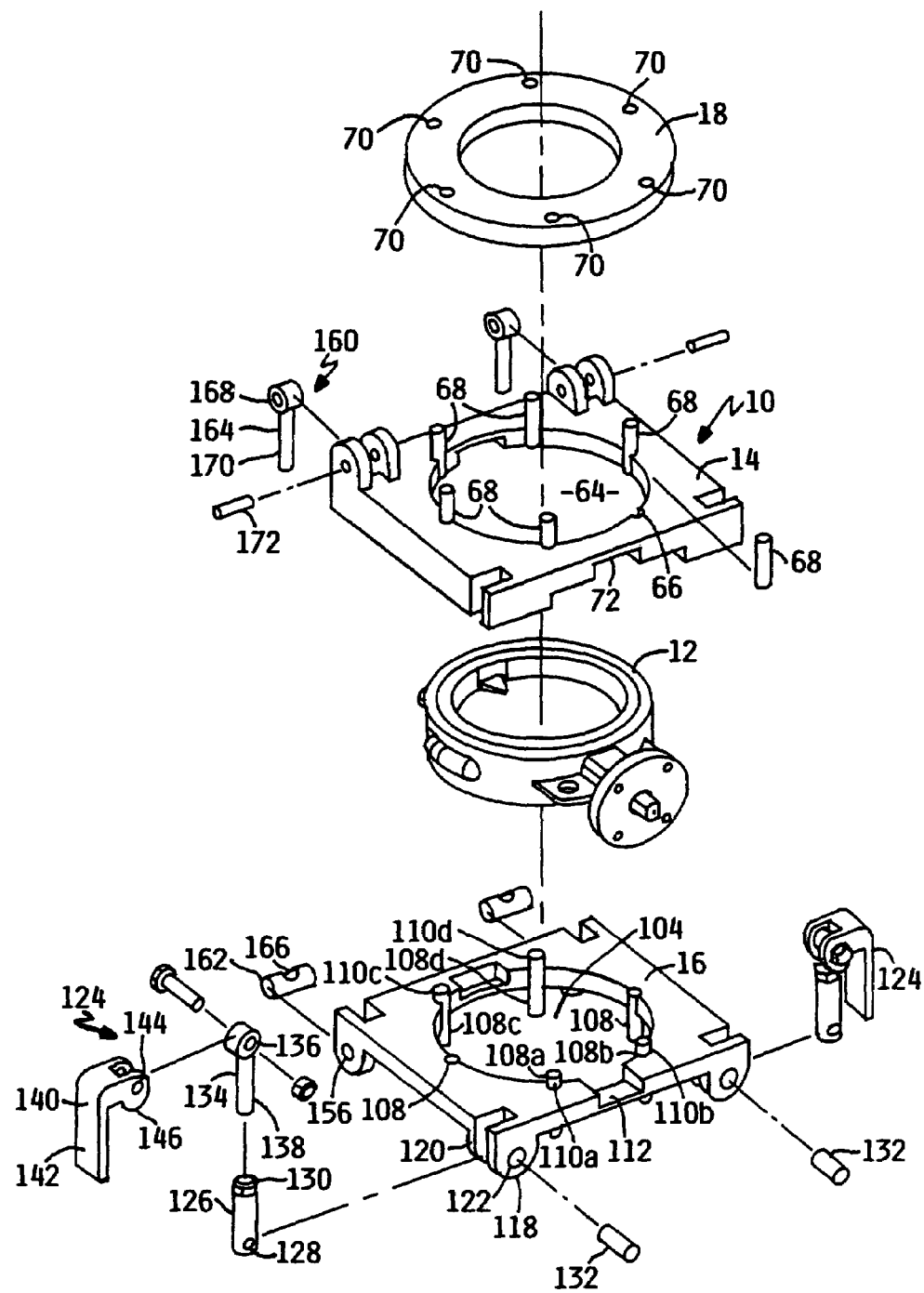
FIG. 1 is a perspective view of a hopper tee mounting assembly of the present invention and a valve member, prior to assembling the hopper tee mounting assembly.
Figure 2:
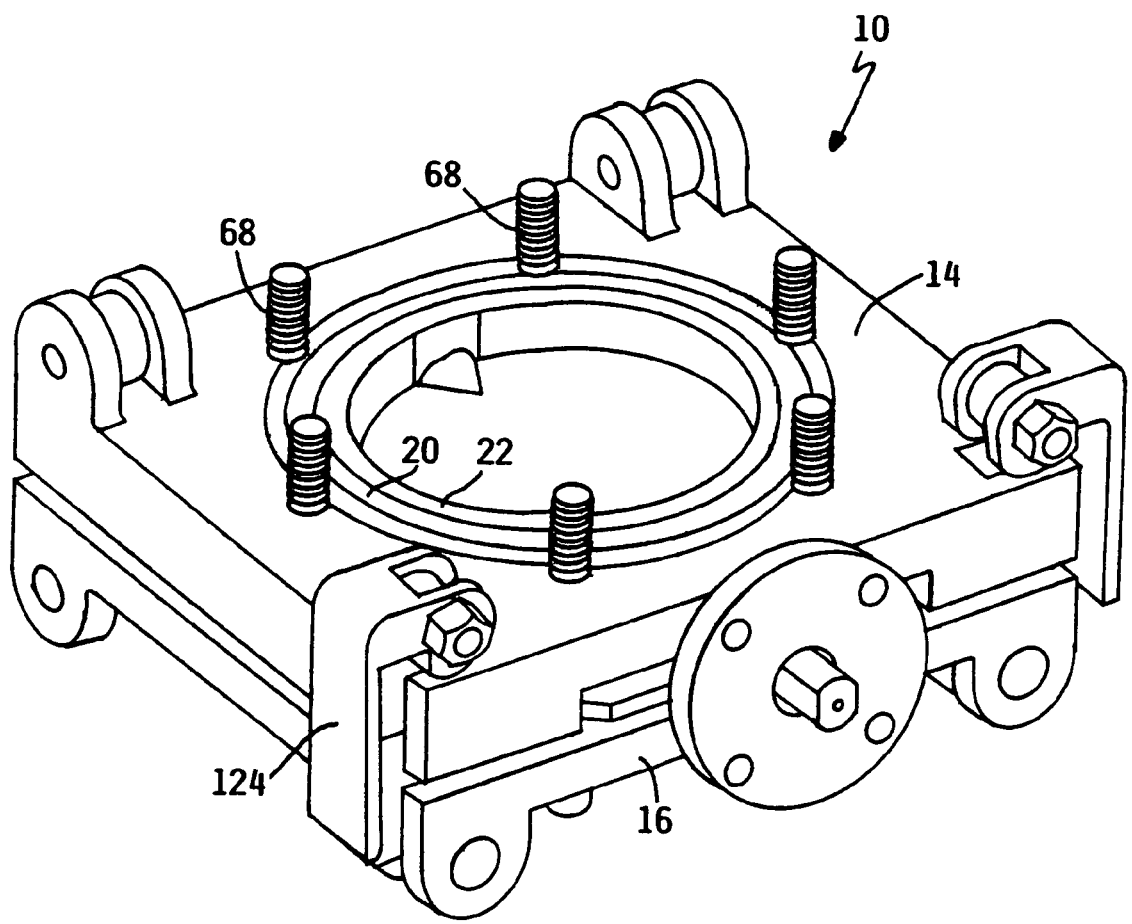
FIG. 2 is a perspective view of the hopper tee mounting assembly and the valve member of FIG. 1 as assembled.

FIG. 1 illustrates a hopper tee mounting assembly 10 in accordance to the present invention and a valve member 12, prior to assembling the hopper tee mounting assembly 10. FIG. 2 illustrates the hopper tee mounting assembly 10 and the valve member 12 as assembled.

The hopper tee mounting assembly 10 includes an upper plate 14 and a lower plate 16. The upper plate 14 is adapted to be connected to a flange 18 attached or welded to the bottom of a hopper (not shown). The lower plate 16 is adapted to be connected to the top of a hopper tee (not shown). Positioned between the upper plate 14 and the lower plate 16 is the valve member 12.

Figure 12:
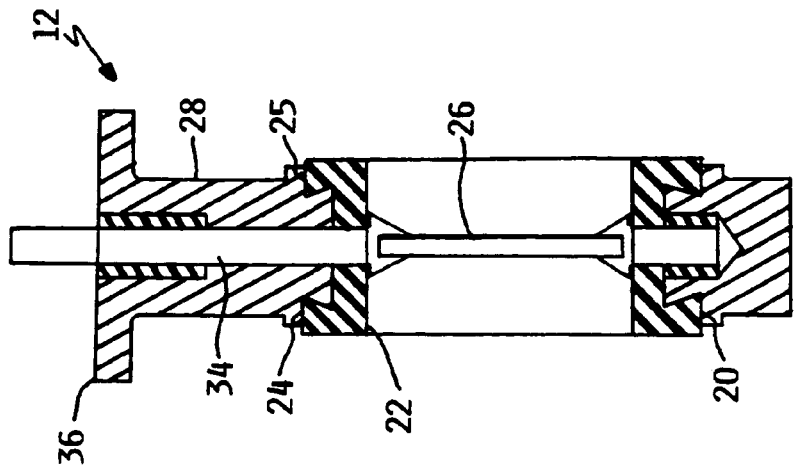
FIG. 12 is a sectional view of the valve member of FIG. 11, as taken along line 12—12.
Figure 11:
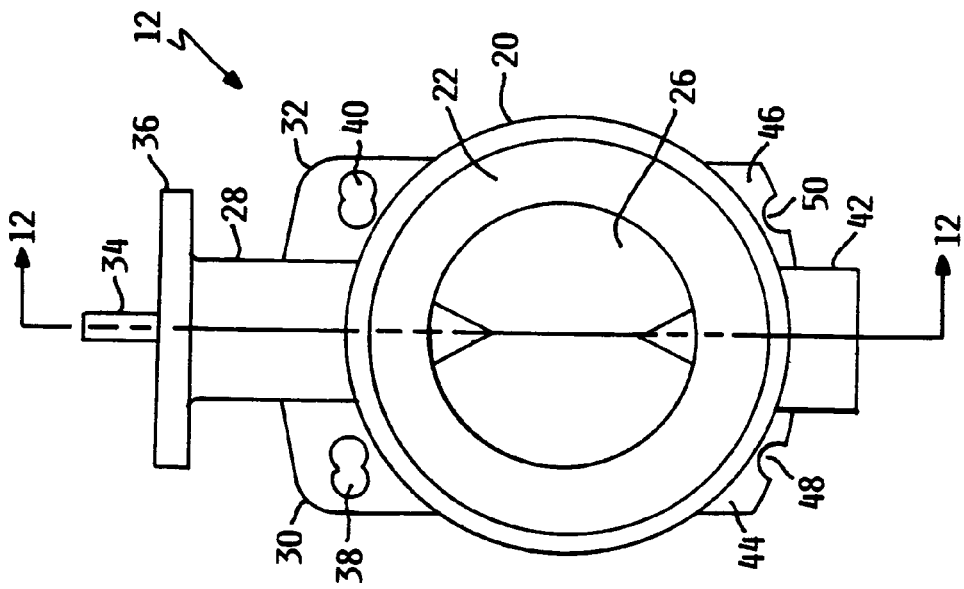
FIG. 11 is a top view the valve member of FIG. 1.

The valve member 12 is illustrated in FIGS. 11 and 12. The valve member 12 has a rigid cylindrical body 20 and a resilient seal 22 located immediately radially inwardly of the rigid cylindrical body 20. One end of the resilient seal 22 protrudes slightly upwardly of the upper surface 24 of the cylindrical body 20. The upwardly protruded portion of the resilient seal allows the resilient seal 22 to be compressed against the flange 18 to create an effective seal between the valve member 12 and the flange 18. The other end of the resilient seal 22 protrudes slightly downwardly of the lower surface 25 of the cylindrical body 20. The downwardly protruded portion of the resilient seal allows the resilient seal 22 to be compressed against the top of the hopper tee to create an effective seal between the valve member 12 and the hopper tee. Radially inwardly of the resilient seal 22 is a butterfly valve 26. The butterfly valve 26 rotates between an opened position and a closed position to control the flow of dry bulk from the hopper to the hopper tee. A front boss 28 and two front retaining brackets 30,32 extend from the front of the cylindrical body 20. The butterfly valve 26 is attached to a stem 34 extending through a bore defined in the front boss 28. The butterfly valve 26 can be manually actuated by an external handle (not shown) attached to a handle mounting flange 36. Each front retaining bracket 30,32 has a retaining aperture 38,40 defined in the front retaining bracket 30,32. A rear boss 42 and two rear retaining brackets 44,46 extend from the rear of the cylindrical body 20. The rear boss 42 has a bore defined therein for retaining the end of the stem 34. Each rear retaining bracket 44,46 has a retaining aperture 48,50 defined in the rear retaining bracket 44,46.

Figure 3:
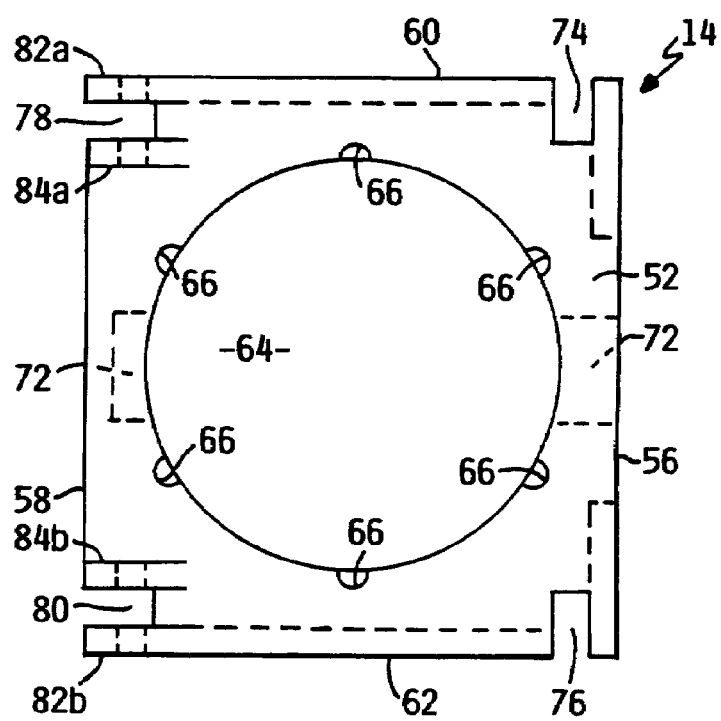
FIG. 3 is a top view of an upper plate of the hopper tee mounting assembly of FIG. 1.
Figure 4:
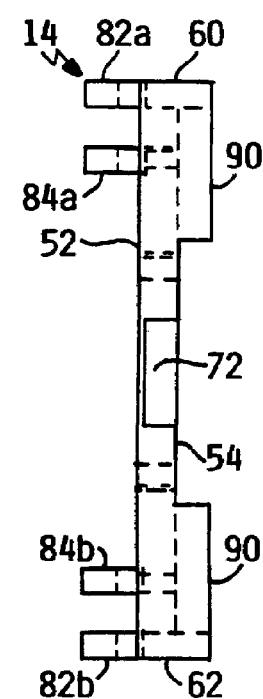
FIG. 4 is a front view of the upper plate of FIG. 3.
Figure 5:
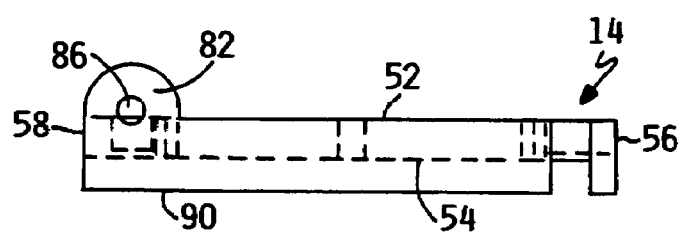
FIG. 5 is a side view of the upper plate of FIG. 3.

The upper plate 14 is illustrated in FIGS. 3–5. The upper plate 14 has an upper surface 52, a lower surface 54, a front surface 56, a rear surface 58 and two side surfaces 60,62. An upper valve member opening 64 is defined in upper plate 14 and extends from the upper surface 52 to the lower surface 54 of the upper plate. The upper valve member opening 64 is sized such that its diameter is greater than the outer diameter of the cylindrical body 20 of the valve member 12 allowing the cylindrical body 20 to fit into the upper valve member opening 64. Six equally space bolt circles 66 are defined at the radial surface of the upper valve member opening 64. The bolt circles 66 are sized to accommodate upwardly extending bolts 68 extending upwardly from the upper surface 52 of the upper plate 14. The bolts 68, and the corresponding bolts circles 66, are positioned to match the position of the holes 70 of the mating flange 18. While the present invention illustrates six equally spaced bolts 68 and bolt circles 66, the number of bolts 68 and bolts circles 66 would depend on the hole pattern of the mating flange 18. For example, flanges attached to larger sized hopper discharge openings have eight hole rather than six holes. Therefore, the upper plate of the present invention, when used in conjunction with the larger flange, would have eight equally spaced bolts extending from the upper surface of the upper plate.

The upper plate 14 has a groove 72 defined at the lower surface 54 of the upper plate. The groove 72 extends from the front surface 56 of the upper plate 14 to a terminal surface located between the upper valve member opening 64 and the rear surface 58 of the upper plate 14. The groove 72 is sized to accommodate the front boss 28 and the rear boss 42 of the valve member.

Defined inwardly from each of the side surface 60,62 of the upper plate 14 is a latch slot 74,76. The latch notches 74,76 are located near the front of the upper plate at a given distance from the front surface 56 of the upper plate 14. Defined inwardly from the rear surface 58 of the upper plate 14 are two pivot slots 78,80. Adjacent each of the pivot slot 78,80 are two semi-circle shaped pivot lobes 82a,84a,82b, 84b. The pivot lobes 82a,84a,82b,84b extend upwardly from the upper surface 52 of the upper plate 14. Defined and extending through each pivot lobe is a pivot hole 86.

A plurality of downwardly extending ledges 90 extends downwardly a given distance from the lower surface 54 of upper plate 14 along portions of the perimeter of the upper plate 14. The ledges 90 are non-continuous around the perimeter of the upper plate to permit the latch slots 74,76 and the pivot slots 78,80 to be exposed. The ledges 90 also terminate at given distances from the groove 72 to provide clearance for the front boss 28 and the front retaining brackets 30,32 of the valve member 12.

The lower plate 16 is illustrated in FIGS. 6–8. The lower plate 16 has an upper surface 92, a lower surface 94, a front surface 96, a rear surface 98 and two side surfaces 100,102. A lower valve member opening 104 is defined in the lower plate 16 and extends from the upper surface 92 to the lower surface 94 of the lower plate. The lower valve member opening 104 is sized such that its diameter is greater than the outer diameter of the cylindrical body 20 of the valve member 12 allowing the cylindrical body 20 to fit into the lower valve member opening 104. Furthermore, the diameter of the lower valve member opening 104 is approximately equal to the diameter of the upper valve member opening 64. Six equally spaced downwardly extending bolt circles 106 are defined at the radial surface of the lower valve member opening 104. The bolt circles 106 are sized to accommodate the downwardly extending bolts 108 extending downwardly from the lower surface 94 of the lower plate 16. The bolts 108, and the corresponding bolt circles 106, are positioned to match with the hole pattern of the hopper tee (not shown). Furthermore, it is preferable that each of the downwardly extending bolts 108 of the lower plate 16 has a corresponding upwardly extending bolt 68 of the upper plate 14 in which the axes of the two bolts are approximately aligned. The two downwardly extending bolts 108a, 108b located near the front of the lower plate 16 and the two downwardly extending bolts 108c,108d located near the rear of the lower plate 16 further have an upwardly extending portion 110a,110b,110c,110d extending upwardly a given distance from the upper surface 92 of the lower plate 16, towards the upper plate 14. The upwardly extending portion 110a,110b of the two bolts 108a,108b located near the front of the lower plate 16 are positioned to be inserted into the front retaining apertures 38,40 defined in the front brackets 30,32 of the valve member 12 to retain and align the valve member 12. The upwardly extending portion 110c,110d of the two bolts 108c,108d located near the rear of the lower plate 16 are positioned to be inserted into the rear retaining apertures 48,50 defined in the rear brackets 44,46 of the valve member 12 to retain and align the valve member 12.

The lower plate 16 has a groove 112 defined at the upper surface of the lower plate 16. The groove 112 extends from the front surface 96 of the lower plate 16 to a terminal surface located between the lower valve member opening 104 and the rear surface 98 of the lower plate 16. The groove 112 is sized to accommodate the front boss 28 and the rear boss 42 of the valve member 12.

Defined inwardly from each of the side surfaces 100,102 of the lower plate 16 is a latch slot 114,116. The latch notches 114,116 are located near the front of the lower plate at a given distance from the front surface 96 of the lower plate 16. Adjacent each of the latch slots 114,116 are two semi-circular shaped latch lobes 118a,120a,118b,120b. The latch lobes 118,120 extend downwardly from the lower surface 94 of the lower plate 16. Defined and extending through each latch lobe 118,120 is a latch hole 122,123.

Two latch assemblies 124 are used to latch together the upper plate 14 with the lower plate 16. Each latch assembly 124 has a tubular stem 126 with a hole 128 defined perpendicular to the axis of the stem at one end of the stem 126 and a threaded bore 130 defined along the axis of the stem at the other end of stem 126. A pin 132 is inserted through the latch holes 122,123 defined in the latch lobes 118,120, and the hole 128 defined in the tubular stem 126 to pivotably retain the latch assembly 124 to the lower plate 116. To allow the tubular stem 126 to pivot relative to the pin 132, the diameter of hole 128 should be sized slightly larger than the outer diameter of the pin 132. Each latch assembly 124 further includes an eyebolt 134. The eyebolt 134 has a hole 136 defined perpendicular to the axis of the eyebolt at one end of the eyebolt 134 and external threads 138, which mates with the threaded bore 130 of the stem 126, at the other end of the eyebolt 134. By rotating the eyebolt 134 relative to the stem 126, the overall axial length of the latch assembly 124 can be increased or decreased. This allows the latch assembly 124 to be adjusted to a desired axial length for properly latching the upper plate 14 with the lower plate 16. A latch 140 is pivotably mounted to the eyebolt 134. The latch 140 has a handle 142 at one end of the latch to allow an operator to manually rotate the latch. The latch 140 defines a hole 144 and a cammed surface 146 at the other end of the latch 140.

The contour of the cammed surface 146 allows the cammed surface 146 to the engage the upper surface 52 of the upper plate 14 when the latch 140 is rotated to a latched position, and allows the cammed surface 146 not to engage the upper surface 52 of the upper plate 14 when the latch is rotated to an unlatched position.

Defined inwardly from the rear surface 98 of the lower plate 16 are two pivot slots 148,150. Adjacent each of the pivot notches 148,150 are two semi-circular shaped pivot lobes 152a,154a,152b,154b extending downwardly from the lower surface 94 of the lower plate 16. Defined and extending through each pivot lobe 152,154 is a pivot hole 156,158.

Two hinge assemblies 160 allow the upper plate 14 and lower plate 16 to pivot relative to each other. Each hinge assembly 160 includes a hinge pin 162 and an eyebolt 164. The hinge pin 162 extends through the pivots holes 156,158 of each set of pivot lobes 152,154. The hinge pin 162 has a threaded hole 166 defined perpendicular to the axis of the hinge pin. The diameter of the hinge pin 162 is sized slightly smaller than the diameter of the pivot holes 156,158 allowing the pivot pin 162 to pivot relative to the pivot lobes 152,154 of the lower plate 16. The eyebolt 164 has a hole 168 defined perpendicular to the axis of the eyebolt at one end of the eyebolt and external threads 170, which mates with the threaded hole 166 of the hinge pin 162, at the other end of the eyebolt. A retaining pin 172 is inserted through the pivot holes 156,158 defined in each set of pivot lobes 152,154 and the hole 168 of the eyebolt 164. The diameter of the retaining pin 172 is sized slightly smaller than the diameter of the hole 168 of the eyebolt 164 allowing the eyebolt 164 to pivot relative to the pivot lobes 62,64 of the upper plate 14.

The hopper tee mounting assembly 10 of the present invention can be pivotably opened to allow the removal of the valve member 12 for cleaning or servicing. The hopper tee mounting assembly 10 can be easily opened by rotating the latches 140 from the latched position to the unlatched position. By rotating the latches 140 to the unlatched position, the cammed surfaces 146 are disengaged from the upper surface 52 of the upper plate 14. This then allows each of the latch assemblies 124 to pivot outwardly out of the corresponding latch slot 74,76 of the upper plate 14. Once both latch assemblies 124 are pivoted out of their corresponding latch slots 74,76, the lower plate 16 is able to pivot freely relative to the upper plate 14 along the hinge assemblies 160. With the hopper tee mounting assembly 10 pivotably opened, the valve member 12 can be removed by lifting it upwardly away from the lower plate 16. The reverse sequence of the opening procedure is used to close the hopper tee mounting assembly 10.

A feature of the present invention is that the hopper tee mounting assembly 10 can be easily opened and still have approximately the same height as the parts which it replaces. Having the same height as the parts which it replaces is accomplished by having the hopper tee mounting assembly 10 be located radially outwardly of the valve member 12. Therefore, no portion of the hopper tee mounting assembly 10 is located directly above the cylindrical body 20 of the valve member or directly below the cylindrical body 20 of the valve member 12. Such a design allows the upper surface 52 of the upper plate 14 immediately radially outwardly of the upper valve member opening 64, which mates with the flange 18, to be approximately flush with the top surface 24 of the rigid cylindrical body 20 of the valve member 12; and the lower surface 94 of the lower plate 16 immediately radially outwardly of the lower valve member opening 104, which mates with the hopper tee, to be approximately flush with the lower surface 25 of the rigid cylindrical body 20. The term "flush" is defined in this application as meaning that the plane defined by one surface is the same plane defined by the other surface. Such a design also allows the resilient seal 22 and the upper surface 24 of the rigid cylindrical body 20 to directly abut the flange 18, and the resilient seal 22 and the lower surface 54 of the rigid cylindrical body 20 to abut the hopper tee.

Figure 9:
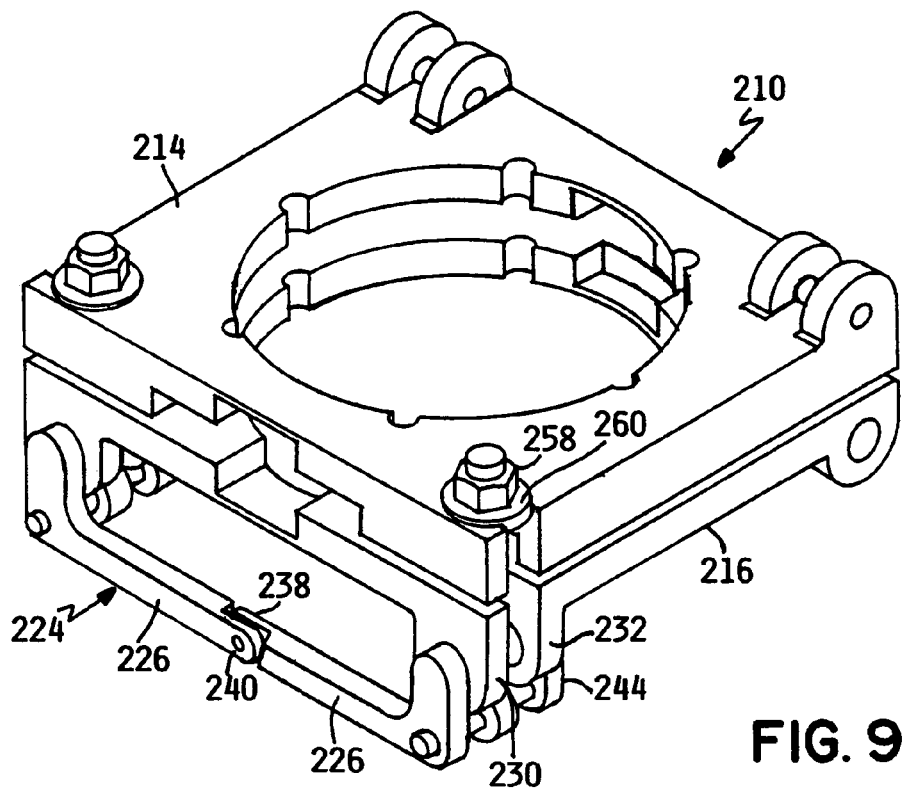
FIG. 9 is a perspective view of a hopper tee mounting assembly, in accordance to a second embodiment of the present invention.
Figure 10:
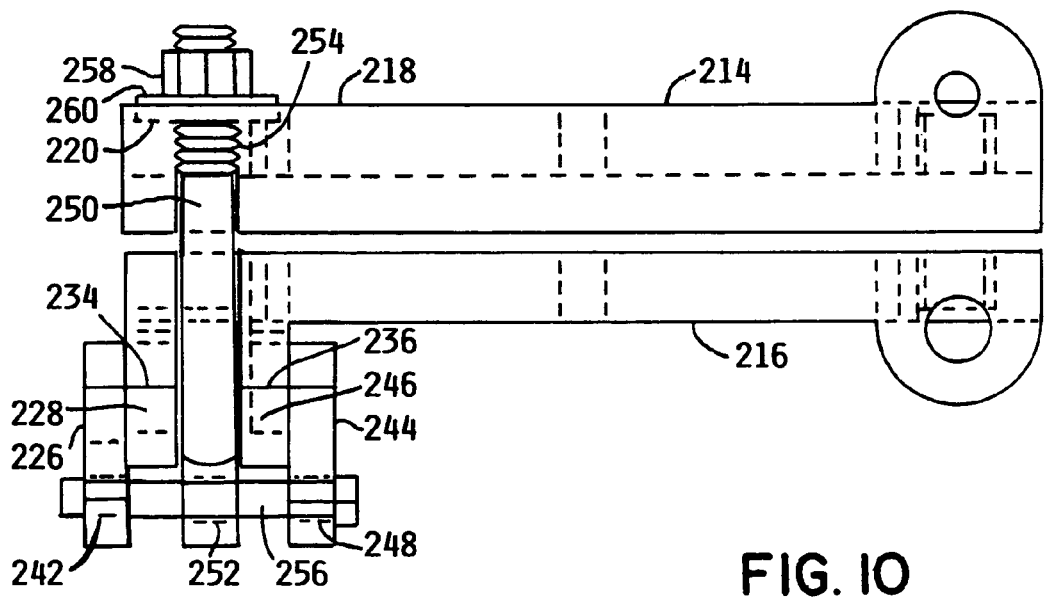
FIG. 10 is a side view of the hopper tee mounting assembly of FIG. 9.

A hopper tee mounting assembly, in accordance to the second embodiment, is illustrated in FIGS. 9 and 10. The second embodiment of the hopper tee mounting assembly 210 is similar to the hopper tee mounting assembly 10 of the first embodiment with the exception of tamper-proof handles.

When delivering certain bulk products, such as food products, a tamper-proof procedure is necessary to assure that no contaminant is introduced into the trailer from the time the dry bulk has been fully loaded into the trailer until the dry bulk is ready to be discharged from the trailer. The tamper-proof procedure usually involves inserting a tie-strap through a set of holes in which the tie-strap must be severed in order for the trailer to be opened. Such tamper-proof procedure allows one to visually inspect the trailer to determine if the trailer has been tampered with before dry bulk is ready to be discharged from the trailer.

The upper plate 214 of the second embodiment of the hopper tee mounting assembly 210 is similar to the upper plate 14 of the first embodiment with the exception of an annular shaped indentation 220 defined on the upper surface 218 of the upper plate 214 at the end of each latch slot 222. The lower plate 216 of the second embodiment is identical to the lower plate 16 of the first embodiment.

Similar to the hopper tee assembly of the first embodiment, the hopper tee assembly of the second embodiment has two latch assemblies 224 for latching together the upper plate 214 with the lower plate 216. Each latching assembly 224 includes an L-shaped handle 226. At one end of the handle is a cylindrical protrusion 228 extending perpendicular from the axis of the handle and into the corresponding latch hole 234 of the forwardly located latch lobe 230, allowing the handle 226 to be pivotably mounted to the lower plate 216. A notch 238 is defined at the elongated end of each handle 226, allowing the ends of the handles to overlap each other when the handles are rotated to the latched position. Also defined at the elongated end of each handle 226 and perpendicular to the axis of the handle is a tamper-proof hole 240. The tamper-proof holes 240 of the two handles 226 are axially aligned with each other when the handles are in the latched positioned. This aligned arrangement of the tamper-proof holes 240 allows a tie-strap (not shown) to be inserted into the tamper-proof holes 240 when the handles are in the latched positioned to provide assurance that the handles have not rotated from the latched positioned. A hole 242 is defined at the bend of the handle and is located a given distance from the cylindrical protrusion 228.

A rear latching bracket 244 is located rearwardly of the rearwardly located latching lobe 232. At one end of the rear latch bracket 244 is a cylindrical protrusion 246 extending perpendicular from the axis of the rear latch bracket and into the corresponding latch hole 236 of the rearwardly located latch lobe 232 allowing the rear latch bracket 244 to be pivotable mounted to the lower plate 216. Located a given distance from the cylindrical protrusion 246 is a hole 248 perpendicular to the axis of the rear latch bracket 244.

An eyebolt 250 is located between the handle 226 and the rear latching bracket 244. The eyebolt 250 has a hole 252 defined perpendicular to the axis of the eyebolt at one end of the eyebolt 250 and external threads 254 formed at the other end of the eyebolt 250. A bolt 256 is inserted through the hole 248 of the rear latching bracket 244, the hole 252 of the eyebolt 250 and the hole 242 of the handle 226. Since the hole 242 of the handle 226 is located a given distance from the cylindrical protrusion 228, a rotational movement of the handle 226 translates into an axial movement of the eyebolt 250.

A nut 258, located upwardly of the upper surface 218 of the upper plate 214, is threaded to the external threads 254 of the eyebolt 250. A rim 260 extends radially outwardly from the bottom of the nut 258. The outer diameter of the rim 260 is sized slightly smaller than the outer diameter of the indentation 220 at the end of the latch slot 222. This allows the rim 260 to be seated within the indentation 220 preventing the eyebolt 250 from pivoting outwardly of the latch slot 222 unless the eyebolt 250 and the nut 258 has moved sufficiently axially upwardy to allow the rim 260 to rise above the indentation 220.

The hopper tee mounting assembly 210 of the second embodiment can be easily opened by rotating the handles 226 from the latched position to the unlatched position. While the handles 226 are in the latched position, the rim 260 of the nut 258 is seated within the indentation 220 of the upper surface 218 preventing the eyebolt 250 from pivoting outwardly out of the latch slot 222. By rotating the handles toward the unlatched position, the eyebolts 250 and the nuts 258 are moved axially upward. Once the handles 226 are in the unlatched position, the rims 260 of the nuts 258 are located above the upper surface 218 of the upper plate 214, allowing the eyebolts 250 of the latch assemblies 224 to pivot outwardly out of the corresponding latch slots 222 of the upper plate 214. Once both latch assemblies 224 have been pivoted out of their corresponding latch slots 222, the lower plate 216 is able to pivot freely relative to the upper plate 214 along the hinge assemblies 262. With the hopper tee mounting assembly 210 pivotably opened, the valve member (not shown) can be removed by lifting it upwardly away from the lower plate 216. The reverse sequence of the opening procedure is used to close the hopper tee mounting assembly of the second embodiment.

Figure 14:
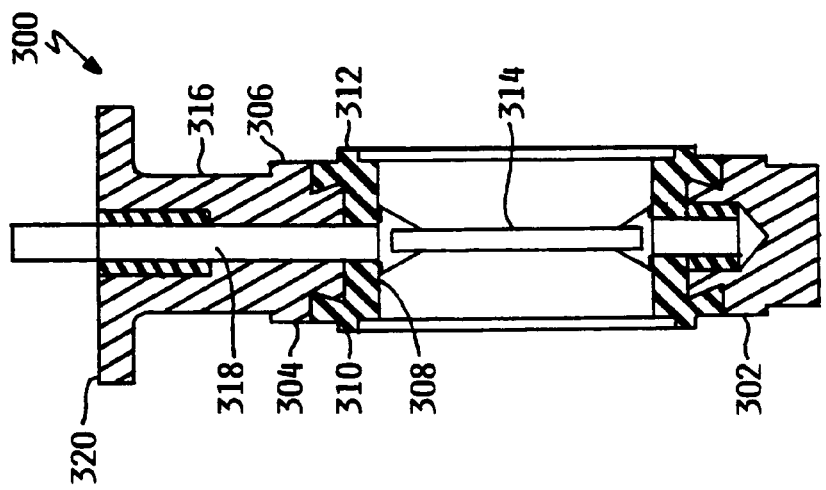
FIG. 14 is a sectional view of the valve member of FIG. 13, as taken along line 14—14.
Figure 13:
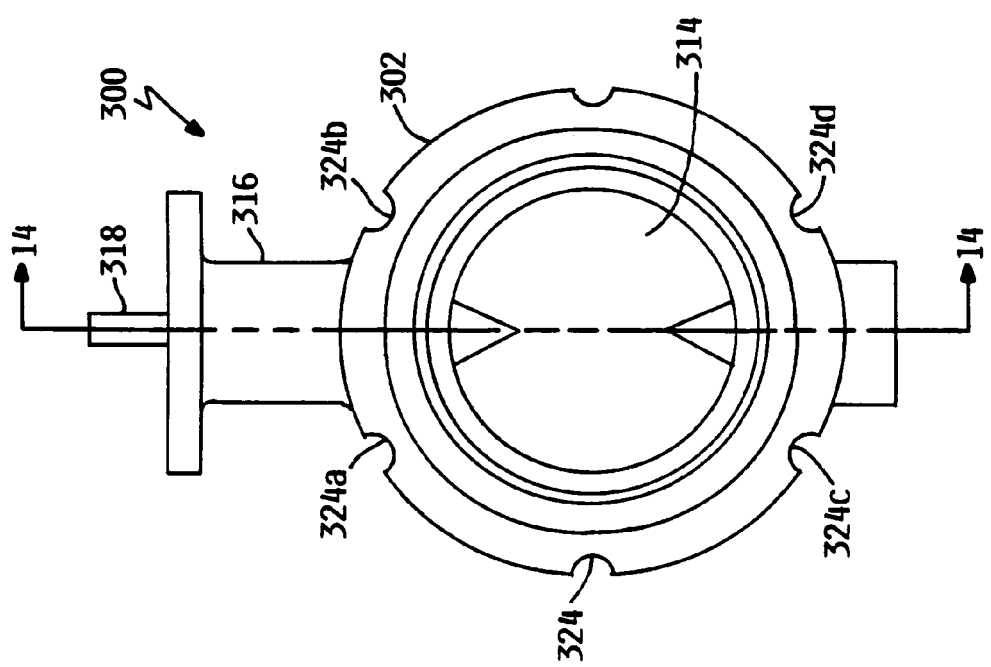
FIG. 13 is a top view of an alternative valve member which can be used with the hopper tee mounting assembly of the present invention.

While the exemplary valve member 12 disclosed with the hopper tee mounting assemblies 10, 210 of the present invention is a valve member similar to the valve members manufactured by Sure Seal Inc., other types of valve members can also be used with the hopper tee mounting assemblies of the present invention. One such other type is a valve member 300, similar to the valve members manufactured by Ultraflo Corp., illustrated in FIGS. 13 and 14.

The valve member 300 has a rigid cylindrical body 302 and a resilient seal 308 located immediately radially inwardly of the cylindrical body 302. One end of the resilient seal 308 protrudes slightly upwardly of the upper surface 304 of the cylindrical body 302. The other end of the resilient seal 308 protrudes slightly downwardly of the lower surface 306 of the cylindrical body 302. Radially inwardly of the resilient seal 308 is a butterfly valve 314. A front boss 316 extends from the front of the cylindrical body 302. The butterfly valve 316 is attached to a stem 318 extending through a bore defined in the front boss 316. The butterfly valve 316 can be manually actuated by an external handle (not shown) attached to a handle mounting flange 36. A rear boss 322 extends from the rear of the cylindrical body 302. The rear boss 322 has a bore defined therein for retaining the end of the stem 318. Six equally spaced retaining apertures 324 are defined on the radially outer surface of the cylindrical body.

As previous discussed, the hopper tee mounting assemblies 10,210 of the present invention can be used for multiple types of valve members. Therefore, the hopper tee mounting assemblies 10,210 of the present invention not only accommodate the valve member 12 but also accommodate the valve member 300. Some of these accommodations of the valve member 300 by the hopper tee mounting assemblies 10,210 of the present invention are described below.

The upwardly extending portion 110a,110b of the two bolts 108a,108b located near the front of the lower plate 16 are positioned to be inserted into the front retaining apertures 324a,324b defined on the radially outer surface of the cylindrical body 302 of the valve member to retain and align the valve member 300. The upwardly extending portions 110c,110d of the two bolts 108c,108d located near the rear of the lower plate 16 are positioned to be inserted into the rear retaining apertures 324c,324d defined on the radially outer surface of the cylindrical body 302 of the valve member to retain and align the valve member 300.

The groove 72 of the upper plate 14 and the groove 112 of the lower plate 16 are sized to accommodate the front boss 316 and the rear boss 322 of the valve member 300.

The upper surface 52 of the upper plate 14 immediately radially outwardly of the upper valve member opening 64, which mates with the flange 18, is approximately flush with the upper surface 304 of the rigid cylindrical body 302 of the valve member 300. The lower surface 94 of the lower plate 16 immediately radially outwardly of the lower valve member opening 104, which mates with the hopper tee, is approximately flush with the lower surface 306 of the rigid cylindrical body 302 of the valve member 300.

The upper surface 52 of the upper plate 14 immediately radially outwardly of the upper valve member opening 64, which mates with flange 18, is below the upper surface 310 of the resilient seal 308 to allow the resilient seal 308 to be compressed against the flange 18 to create an effective seal between the valve member 300 and the flange 18. The lower surface 312 of the lower plate 16 immediately radially outwardly of the lower valve member opening 104, which mates with the hopper tee, is above the lower surface 312 of the resilient seal 308 to allow the resilient seal 308 to be compressed against the hopper tee to create an effective seal between the valve member 300 and the hopper tee.

A hopper tee assembly, in accordance to the third embodiment, is illustrated in FIGS. 15–18. The hopper tee mounting assembly 410 of the third embodiment is functional similar to the hopper tee mounting assembly 10 of the first embodiment.

The hopper tee mounting assembly 410 of the third embodiment has an upper mounting assembly 412 and a lower mounting assembly 414. The upper mounting assembly 412 includes two flange plates 418a, 418b and two upper retaining plates 420a, 420b. The lower mounting assembly 414 includes two hopper tee plates 422a, 422b and two lower retaining plates 424a, 424b. The two flange plates 418a, 418b, together with the two upper retaining plates 420a, 420b perform essentially the same function as the upper plate 14 of the first embodiment. The two hopper tee plates 422a, 422b, together with the two lower retaining plates 424a, 424b perform essentially the same function as the lower plate 16 of the first embodiment.

The flange plates 418a and 418b are symmetrically opposite of each other. For the purpose of this application, symmetrically opposite is defined as mirrored images of each other, in which the same features are present in both components, but the features are located 180 degrees from one component relative to the location for the same feature of the other component. Each flange plate 418 has an upper surface 426, a lower surface 428, a front surface 430, a rear surface 432, a side surface 434 and a semi-circle shaped curved surface 436. Defined at the curved surface 436 are three approximately equally spaced semi-circle shaped notches 438. The flat upper surface 426 of the flange plate 418 is adapted to abut the bottom surface of a flange 18. The lower surface 428 of the flange plate 418 has a groove 440 (not shown) defined thereon. The groove 440 is sized and located to accommodate the corresponding upper retaining plate 420. Defined near the intersection of the rear surface 432 and the side surface 434 of the flange plate 418 is a hinge hole 442 extending from the upper surface 426 to the lower surface 428 of the flange plate 418. Located near the front of the flange plate 418 is a projection 444 extending outwardly from the side surface 434. Defined inwardly at the center of the projection 444 is a latch slot 446. Extending though the projection 444 and perpendicular to the latch slot 446 is a pair of pin retaining holes 447.

A wear plate 448 is attached to the upper surface 426 of the flange plate 418. The wear plate 448 surrounds the inwardly portion of the latch slot 446 and has a slot 450 approximately the same size and shape as the inwardly portion of the latch slot 446. The upper surface of the wear plate 448 has a rut 452, perpendicular to the slot 450, defined thereon. The rut 452 seats a cammed surface of a latch to prevent the latch from accidentally rotating out of the latched position. The wear plate 448 is removable from the flange plate 418 to allow the wear plate 448 to be replaced should the rut 452 be worn to such a manner that it no longer properly seat the cammed surface of the latch.

The upper retaining plate 420 is semi-circle shaped to match the groove 440 located at the lower surface 428 of the flange plate 418. Located at the radially inwardly edge of the upper retaining plate 420 are three approximately equally spaced bolt circles 454. The bolt circles 454 are sized to accommodate upwardly extending bolts 456 extending upwardly from the upper surface 426 of the upper retaining plate 420 upon assembling the hopper mounting assembly 410. The bolt circles 454 are located approximately directly under the notches 438 of the corresponding flange plate 418 when the upper retainer plate 420 is positioned in the groove 440 of the flange plate 418; thus, allowing the bolts 456 to fit within the notches 438 of the upper retainer plate 420 upon assembling the hopper tee mounting assembly 410.

An advantage of having an upper retaining plate 420 separate from a flange plate 418 is that the plates 420, 418 can be formed from different materials. By having the capability to use two different materials, a heavier material can be used for components that require high tensile strength, which a lighter material can be used for components that do not require high tensile strength. An upper retaining plate 420 formed of a material having high tensile strength not only allows the upper retaining plate 420 to be stronger, but also allows the upwardly extending bolts 456, formed of similar or same material, to be easily welded to the upper retaining plate 420. Therefore, by having the upper retaining plate 420 be made of steel, while having the flange plate 418 be made of aluminum, the upper mounting assembly 414 is able to have the high tensile strength required for attaching the upper mounting assembly 414 to the flange 16, while reducing the overall weight of the upper mounting assembly 414 as compared to an upper mounting assembly formed entirely of steel.

The tradeoff for having separate retaining plates and flange plates is of course an increase in cost, manufacturing time and complexity. Therefore, if the weight of the hopper tee mounting assembly is important to the user of the hopper tee mounting assembly, separate retaining plates and flange plates may be preferred. However, if cost of the hopper tee mounting assembly is more important than weight to the user of the hopper mounting assembly, an integrated flange plate providing the functions of retaining the hopper tee mounting assembly 410 to the flange 16 and having a flat surface adapted for abutment with the flange may be preferred. Should an integrated flange plate be preferred, a single integrated flange plate such as the upper plate 14, disclosed in the first embodiment, can be used. Alternatively, two symmetrically opposite integrated flange plates, each having a flat surface adapted for abutment with the flange and having a plurality of upwardly extending bolts attached thereon, can be used in place of the flange plates 418 and the upper retaining plates 420. While not illustrated, such symmetrically opposite integrated flange plates could be similar in shape as the flange plates 418 and the upper retaining plates 420 of the third embodiment once each upper retaining plate 420 is fitted into the groove 420 of the corresponding flange plate 418.

The hopper tee plates 422a, 422b are symmetrically opposite of each other. Each hopper tee plate 422 has an upper surface 460, a lower surface 462, a front surface 464, a rear surface 466, a side surface 468 and a semi-circle shaped curved surface 470. Defined at the curved surface 470 are three approximately equally spaced semi-circle shaped notches 472. The lower surface 462 of the hopper tee plate 422 is adapted to abut the top surface of a hopper tee. The upper surface 460 of the hopper tee plate 422 has a groove 474 defined thereon. The groove 474 is sized and located to accommodate the corresponding lower retaining plate 424. Defined inwardly from the rear surface 466 of the hopper tee plate 422 is a hinge slot 476. The hinge slot 476 is located near the side of the hopper tee plate 422 at a given distance from the side surface 468 of the hopper tee plate 422. Defined inwardly from the side surface 468 of the hopper tee plate 422 is a latch slot 478. The latch slot 478 is located near the front of the hopper tee plate 422 at a given distance from the front surface 464 of the hopper tee plate 422.

The lower retaining plate 424 is semi-circle shaped to match the groove 474 located at the upper surface 460 of the hopper tee plate 422. Located at the radially inwardly edge of the lower retaining plate 424 are three approximately equally spaced bolt circles 480. The bolt circles 480 are sized to accommodate downwardly extending bolts 482 extending downwardly from the lower surface 462 of the hopper tee plate 422 upon assembling the hopper tee mounting assembly. Each downwardly extending bolt 482 further has an upwardly extending portion 484 extending upwardly a given distance from the upper surface of the lower retaining plate 424. The upwardly extending portions 484 of the downwardly extending bolts 482 are positioned to be inserted into the retaining apertures 38, 40, 48, 50 of the valve member 12. The bolt circles 480 are located approximately directly above the notches 472 of the hopper plate 422 when the lower retaining plate 424 is positioned in the groove 474 of the hopper tee plate 422; thus, allowing the downwardly extending bolts 482 to fit within the notches 472 upon assembling the hopper tee mounting assembly 410.

As with the upper mounting assembly 414, an advantage of having a lower retaining plate 424 separate from the hopper tee plate 422 is that the plates 424, 422 can be formed from different materials. Therefore, by having the lower retainer plate 424 be made of steel, while having the hopper tee plate 422 be made of aluminum, the lower mounting assembly 416 is able to have the high tensile strength required for attaching the lower mounting assembly to the hopper tee, while reducing the overall weight of the lower mounting assembly as compared to a lower mounting assembly formed entirely of steel. Should cost of the hopper tee mounting assembly be more important than weight to the user of the hopper mounting assembly, a single integrated flange plate such as the lower plate 16 disclosed in the in the first embodiment can be used. Alternatively, two symmetrically opposite integrated hopper tee plates, each having a flat surface adapted for abutment with the hopper tee and having a plurality of downwardly extending bolts attached thereon, can be used in place of the lower retaining plates and the hopper tee plates of the third embodiment. Such symmetrically opposite integrated hopper tee plates could be similar in shape as the flange plates and the retaining plates of the third embodiment once each retaining plate is fitted into the groove of the corresponding hopper tee plate.

Two hinge assemblies 486 allow the upper mounting assembly 414 and the lower mounting assembly 416 to pivot relative to each other. Each hinge assembly 486 includes an eyebolt 488, a retaining pin 490 and a nut 492. The eyebolt 488 has a hole defined perpendicular to the axis of the eyebolt at one end of the eyebolt and external threads 494 at the other end of the eyebolt. The externally threaded end 494 is inserted through the hinge hole 442 of the flange plate 418 and is retained to the flange plate 418 by the nut 492. The retaining pin 490 is inserted through the hole of the eyebolt 488 and is attached to the hopper tee plate 422.

Two latch assemblies 496 are used to latch together the upper mounting assembly 414 with the lower mounting assembly 416. The latch assembly 496 of the third embodiment is similar to the latch assembly 124 of the first embodiment with the exception of the handle 500 enlarged and having a grooved outer surface 502 to provide better grip during the latching operation.

As with the latching assembly of the first embodiment, the latch 498 has a cammed surface 504 at the end of the latch 498 opposite the handle 500. The contour of the cammed surface 504 allows the cammed surface 504 to be seated within the rut 452 of the wear plate 448 when the latch 498 is rotated to a latched position. The contour of the cammed surface 504 also allows the cammed surface 504 to be unseated from the rut 452 of the wear plate 448 when the latch 498 is rotated to an unlatched position. With the latch assembly 496 positioned in the latch slot 446 of the flange plate 418 and the latch 498 rotated to the latched position, an unlatching prevention pin 506 is inserted into the pin retaining holes 447. Since the unlatching prevention pin 506 is located outwardly of the latch assembly 496 when the latch assembly 496 is in the latched position, the unlatching prevention pin 506 provides a secondary mean for preventing the latch assembly 496 from pivoting out of the latch slot 446.

As with the hopper tee assembly of the first embodiment, the hopper tee mounting assembly 410 of the third embodiment can be pivotable opened to allow the removal of the valve member 12 for cleaning or servicing. The hopper tee mounting assembly 410 can be easily opened by rotating the two latches 498 from the latched position to the unlatched position. By rotating the latches 498 to the unlatched position, the cammed surfaces 504 are unseated from the ruts 452 of the wear plates 448. This then allows the latch assemblies 496 to pivot outwardly out of the corresponding latch slots 446 of the flange plates 418. Once both latch assemblies 496 are pivoted out of their corresponding latch slots 446, the lower mounting assembly 416 is able to pivot freely relative to the upper mounting assembly 414. It should be noted that since the two upper retaining plates 420 are bolted to the flange 18 with the two flange plates 418 sandwiched between the flange 18 and the corresponding upper retaining plates 420, the two upper retaining plates 420 and the two flange plates 418 act as an unitary structure upon the upper retaining plates 420 bolted to the flange 18. Likewise, since the two lower retaining plates 424 are bolted to the hopper tee with the two hopper tee plates 422 sandwiched between the hopper tee and the corresponding lower retaining plates 424, the two lower retaining plates 424 and the two hopper tee plates 422 act as an unitary structure upon the lower retaining plates 424 bolted to the hopper tee. With the hopper tee mounting assembly 410 pivotably opened, the valve member 12 can be removed by lifting it upwardly from the lower mounting assembly 416. The reverse sequence of the opening procedure is used to close the hopper tee mounting assembly 410.

As with the hopper tee mounting assembly of the previous embodiments, a feature of the hopper tee mounting assembly 410 of the third embodiment is that the hopper tee mounting assembly 410 can be easily opened and still have approximately the same height as the parts which it replaces.

Figure 19:
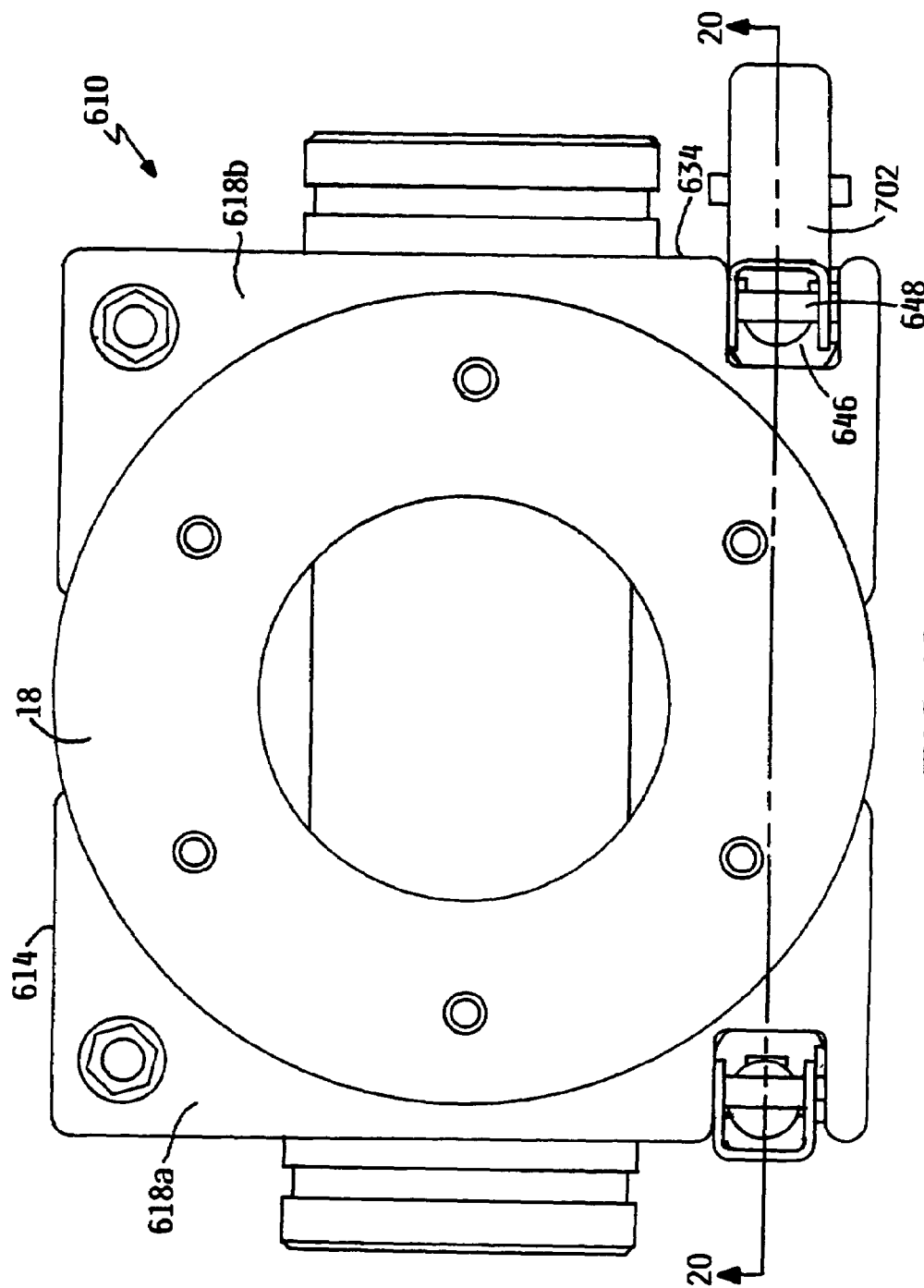
FIG. 19 is a top of a hopper tee mounting assembly, in accordance to a fourth embodiment of the present invention.
Figure 20:
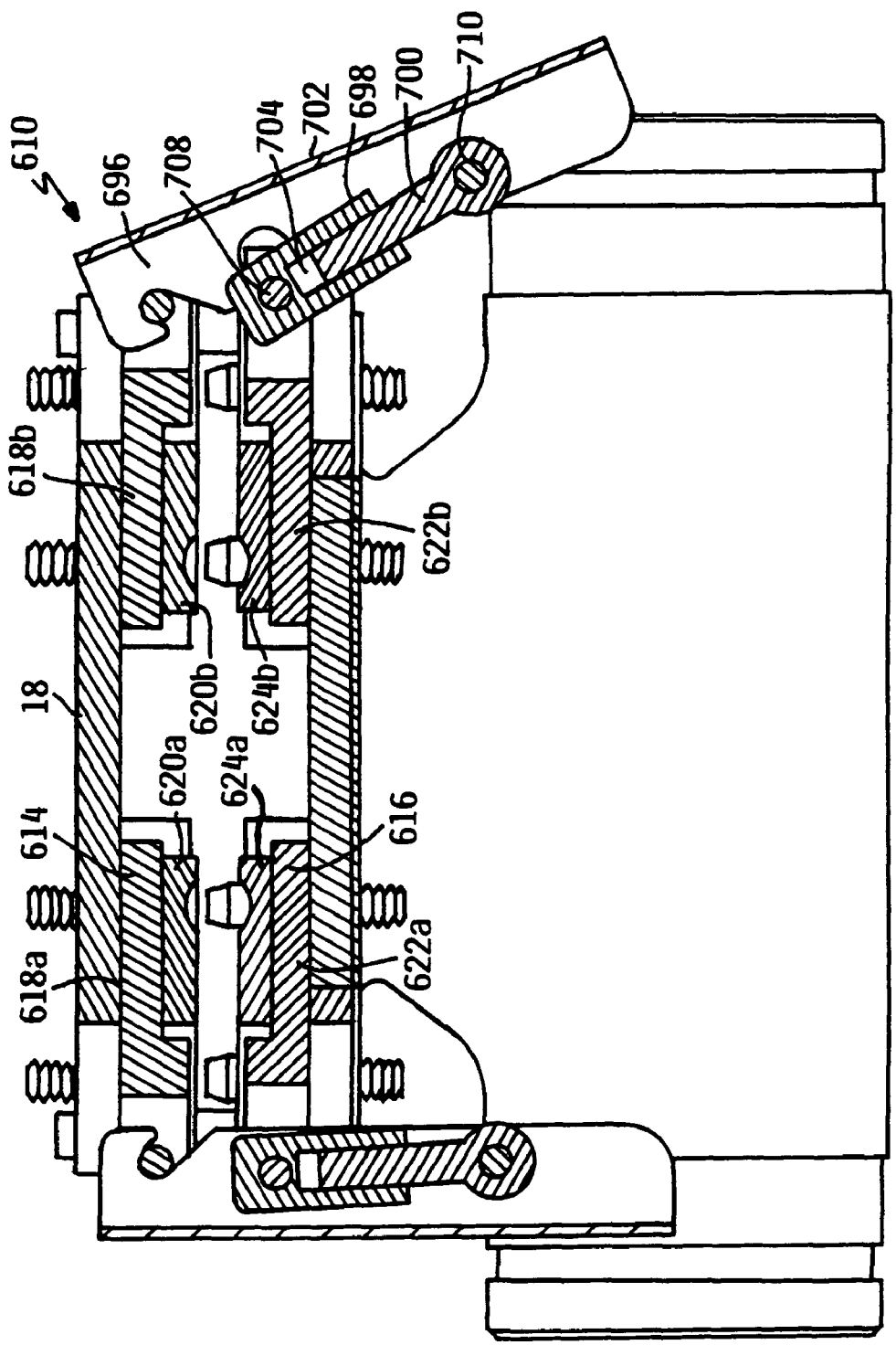
FIG. 20 is a sectional view of the hopper tee mounting assembly of FIG. 19, as taken along line 20—20.

A hopper tee mounting assembly, in accordance to the fourth embodiment, is illustrated in FIGS. 19 and 20. The hopper tee mounting assembly 610 of the fourth embodiment is similar to the hopper tee mounting assembly of the third embodiment, but has a different latch assembly.

The hopper tee mounting assembly 610 of the fourth embodiment has an upper mounting assembly 614, a lower mounting assembly 616, two hinge assemblies (not shown) and two latch assemblies 696. The upper mounting assembly 614 includes two symmetrically opposite flange plates 618a, 618b and two symmetrically opposite upper retaining plates 620a, 620b. The lower mounting assembly 616 includes two symmetrically opposite hopper tee plates 622a, 622b and two symmetrically opposite lower retaining plates 624a, 624b. The latch assemblies 696 latch the upper mounting assembly 614 together with the lower mounting assembly 616.

Figure 21:
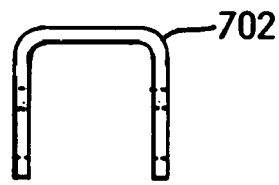
FIG. 21 is a top view of the latch of FIG. 19.
Figure 22:
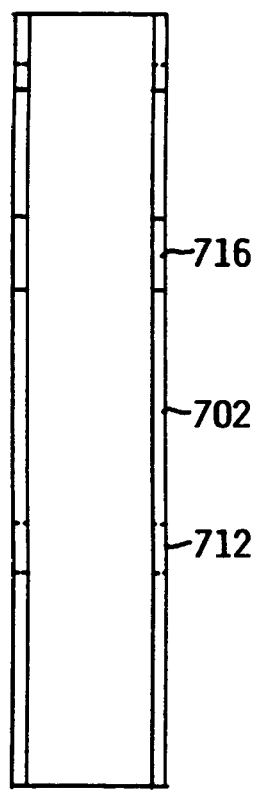
FIG. 22 is a front view of the latch of FIG. 21.
Figure 23:
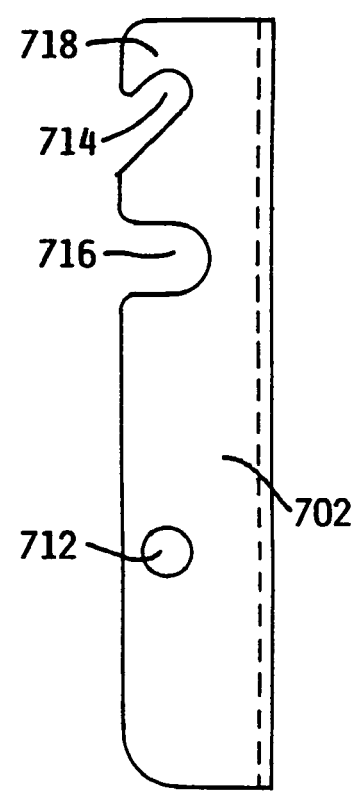
FIG. 23 is a side view of the latch of FIG. 21.

As with the hopper mounting assembly of the third embodiment, each flange plate 618 has a latch slot 646 defined inwardly from the side surface 634 of the flange plate 618. Located perpendicular to the latch slot 646 is a catch pin 648. Each latch assembly 696 is pivotably mounted to the corresponding hopper tee plate 622. Each latch assembly 696 has a cylinder 696, a rod 700 and a latch 702. The cylinder 698 has a bore 704 extending axially inwardly from an entrance at one end of the cylinder 698 and a pivot hole 706 perpendicular to the axis of the cylinder near the other end of the cylinder 706. A pivot pin 708 is inserted through the pivot hole 706 of the cylinder 698 and is attached to the hopper tee plate 622. The rod 700 is inserted into the bore 704 of the cylinder 698 at one end and has a hole 710 near the other end of the rod 700. The latch 702, disclosed in detail in FIGS. 21–23, has a hole 712, a catch slot 714 and a pivot pin slot 716. A pin is inserted through the hole 710 of the rod 700 and the hole 712 of the latch 702 to pivotable connect the rod 700 to the latch 702. The catch slot 714 is slanted upwardly thus creating a hook 718 to retain the latch 702 onto the catch pin 648 when the latch is in the latched position. The pivot pin slot 716 is located and sized such that when the latch 702 is rotated toward the latched position, the pivot pin slot 716 provides the necessary clearance to prevent the pivot pin 708 from hitting the latch 702.

The hopper tee mounting assembly 610 of the fourth embodiment can be easily opened by first rotating the latch 702 outwardly. At the outwardly rotated position, the latch 702 is able to slide upwardly away from the catch pin 648. Once both latches 702 have cleared the corresponding catch pins 648, the lower mounting assembly 616 is able to pivot freely relative to the upper mounting assembly 614. With the hopper tee mounting assembly 610 pivotable opened, the valve member 12 can be removed by lifting it upwardly away from the lower mounting assembly 616. The reverse sequence of the opening procedure is used to close the hopper tee mounting assembly 610.

Figure 24:
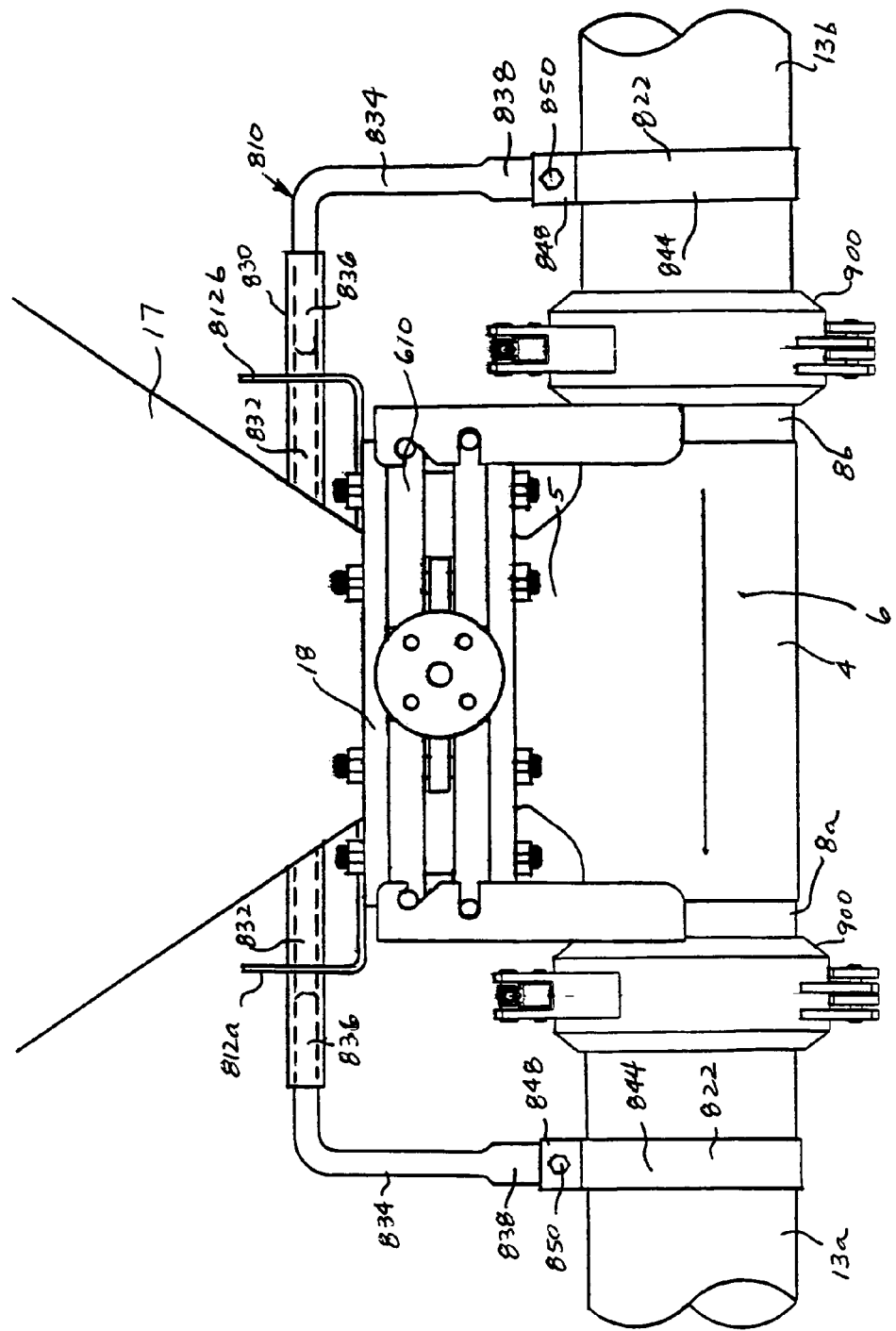
FIG. 24 is a front view of the bottom portion of a hopper trailer including a hopper tee mounting assembly, a swing pipe assembly, and a clamp assembly in accordance to the present invention.
Figure 25:
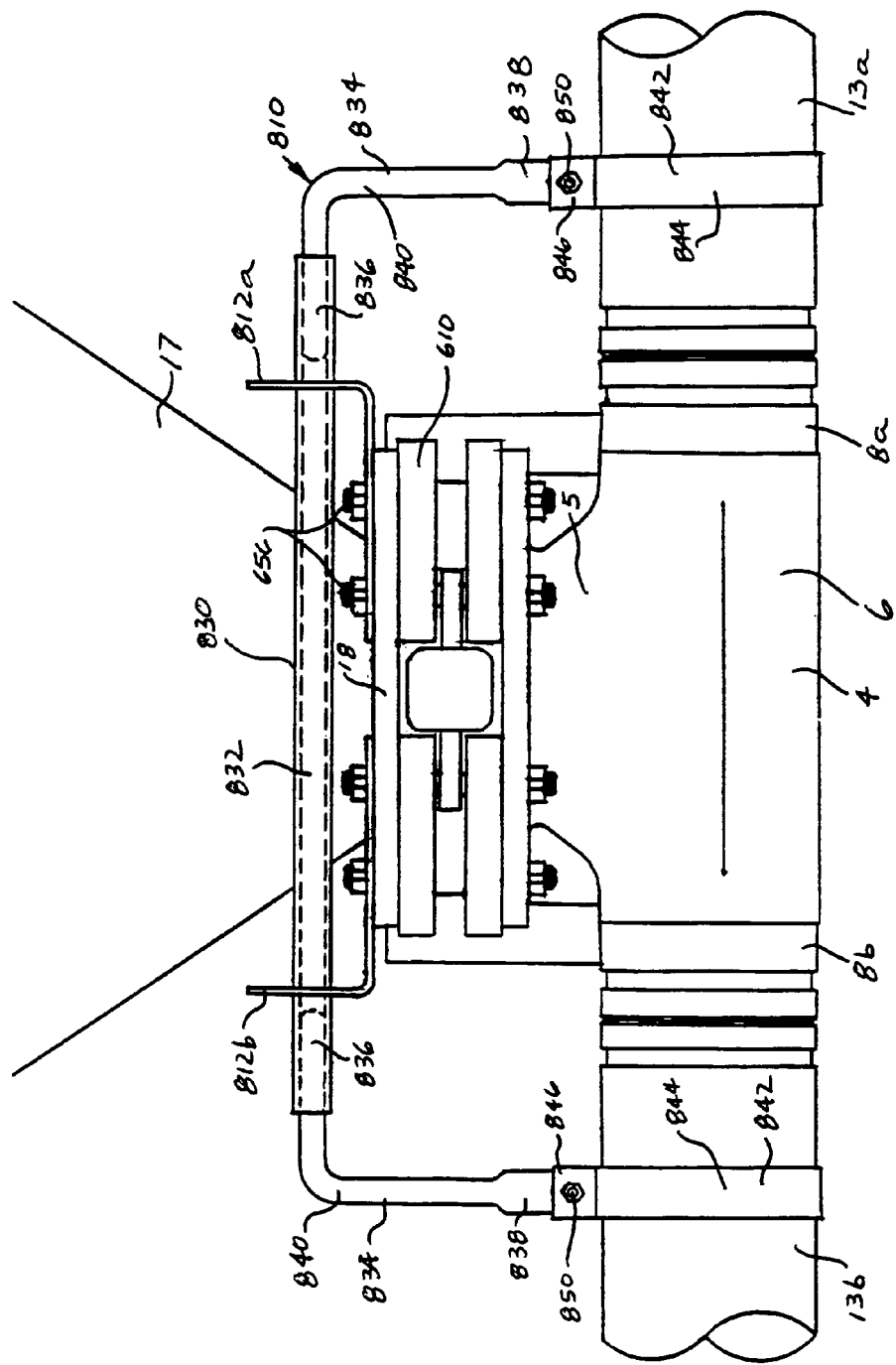
FIG. 25 is a back view of the bottom portion of the hopper trailer of FIG. 24, with the clamp assembly removed.

FIGS. 24 and 25 illustrate the bottom of a hopper trailer including a hopper 17, a flange 18, a hopper tee mounting assembly 610 in accordance to the present invention, a hopper tee 4, two connection pipes 13a, 13b, and a swing pipe assembly 810 in accordance to the present invention. FIG. 24 additionally illustrates a clamp assembly 900 in accordance to the present invention.

The hopper tee 4 has a vertical portion 5 and a horizontal portion 6. Two pipes 8a,8b form the ends of the horizontal portion 6.

The swing arm assembly 810 includes two brackets 812a,812b, a sleeve 830, two swing arms 834, and two pipe retainers 842. The brackets 812a,812b are symmetrically opposite of each other and are mounted to the top surface of the flange 18. For the purpose of this application, symmetrically opposite is defined a mirror images of each other, in which the same features are present in both components, but the features are located 180 degrees from one component relative to the location for the same feature of the other component.

Figures 26, 27:
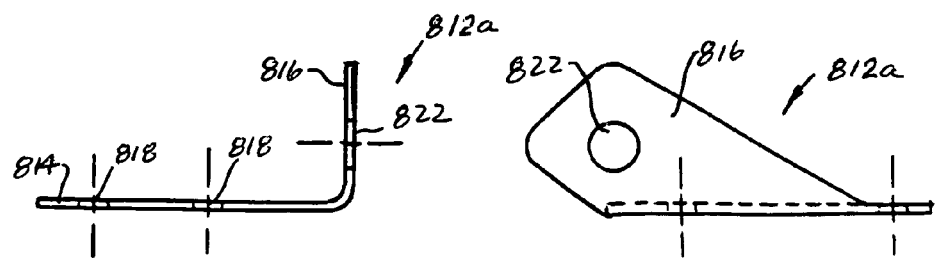
FIG. 26 is a back view of the swing pipe bracket of FIG. 24.
FIG. 27 is a side view of the swing pipe bracket of FIG. 26.
Figures 28, 29:
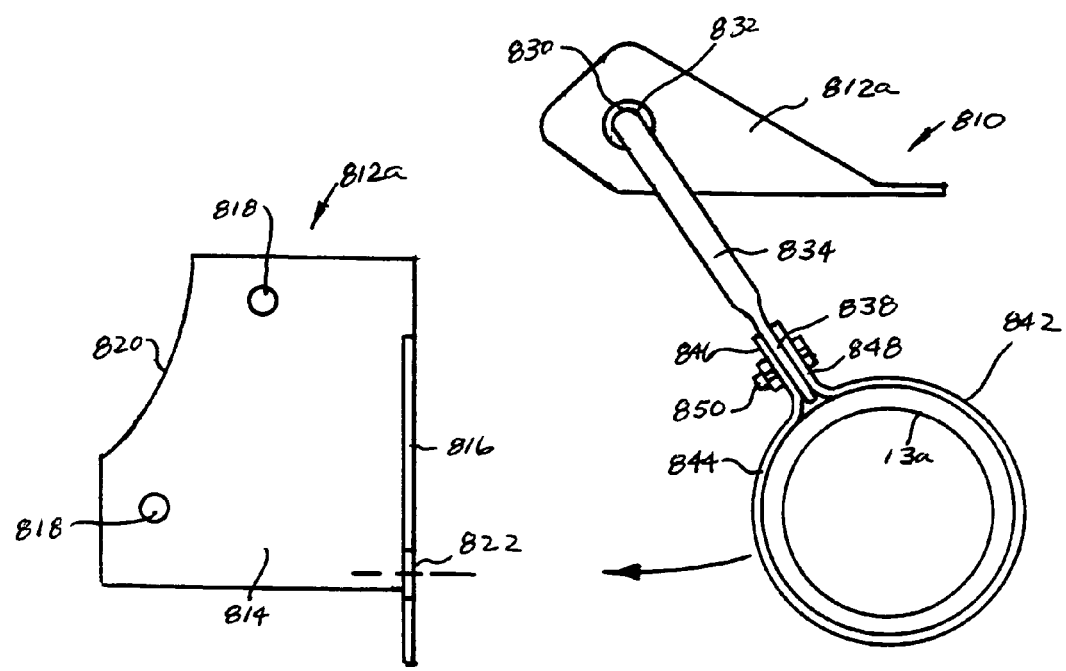
FIG. 28 is a top view of the swing pipe bracket of FIG. 26.
FIG. 29 is a side view of the swing pipe assembly of FIG. 24.

As illustrated in detail in FIGS. 26–28, the bracket 812a has a horizontal mounting portion 814 and a vertical swing arm attachment portion 816. The mounting portion 814 has two mounting holes 818 defined therein to receive the corresponding upwardly extending bolts 656 (see FIG. 25) extending from the flange 18. Defined at one end of the mounting portion 814 is a curved cutout 820 adapted to accommodate the bottom of the hopper 17. The swing arm attachment portion 816 extends upwardly from the end of the mounting portion 814, approximately opposite of the curved cutout 820. The swing arm attachment portion 816 defines a sleeve retaining hole 822. At their mounted position, the swing arm attachment portions 816 of the brackets 812a and 812b are located at the outer edges of the brackets.

The sleeve 830 is inserted through the sleeve retaining holes 822 of the brackets 812a,812b. As illustrated in FIGS. 24, 25 and 29, the sleeve 830 defines a bore 832 extending through the sleeve. The swing arm 834 has a cylindrical pivot portion 836 at one end, a flat attachment portion 838 at the other end, and a L-shaped portion 840 connecting the pivot portion 836 to the attachment portion 838. The pivot portion 836 of the swing arm is inserted into the bore 832 of the sleeve 830, thus allowing the swing arm 834 to pivot relative to the sleeve 830 and bracket 812a,812b as illustrated in FIG. 29. A hole (not shown) is defined in the attachment portion 838, with the axis of the hole approximately perpendicular to the flat surface of the attachment portion.

The pipe retainer 842 has a generally cylindrical pipe retaining portion 844 and two generally flat clamping portions 846,848. The pipe retaining portion 844 is sized to surround the corresponding connecting pipe 13a,13b. Extending from the terminal ends of the pipe retaining portion 844 are the clamping portions 846,848. Each clamping portion 846,848 defines a hole (not shown). Upon installing the piper retainer 842 to the swing arm 834, the holes of the clamping portions 846,848 are aligned with the hole of the attachment portion 838 of the swing arm. A bolt 850 is inserted through the holes of the clamping portions 846,848 and the hole of the attachment portion 838 of the swing arm to secure the pipe retainer 842 to the swing arm 834.

The clamp assembly 900 includes a first semi-circular clamp arm 902, a second semi-circular clamp arm 904, a lever 906, a latch 908, and a gasket 910.

The first clamp arm 902 has a first end portion 912 and a second end portion 914. The first end portion 912 of the first clamp arm has a plurality of semi-circular ears 916. Each ear 916 of the first clamp arm 902 has a hole 918 defined therein. The second clamp arm 904 has a first end portion 922 and a second end portion 924. The first end portion 922 of the second clamp arm has a plurality of semi-circular ears 926. Each ear 926 of the second clamp arm 904 has a hole 928 defined therein. The ears 916 of the first clamp arm 902 and the ears 926 of the second clamp arm 904 are shaped and sized such that upon installing the clamp assembly 900, one of the ears 916 of the first clamp arm 902 fits between the space defined by adjacent ears 926 of the second clamp arm 904. Likewise, one of the ears 926 of the second clamp arm 904 fits between the space defined by adjacent ears 916 of the first clamp arm 902. Furthermore, upon installing the clamp assembly 900, the holes 918 defined in the ears 916 of the first clamp arm 902 are aligned with the holes 928 defined in the ears 926 of the second clamp arm 904. A pin 930 is inserted through the aligned holes 918,928 defined in the ears 916,926 of the first and second clamp arms 902,904 allowing the first end portion 912 of the first clamp arm 902 to be pivotably attached to the first end portion 922 of the second clamp arm 904.

The second end portion 914 of the first clamp arm 902 has a radially extending boss 932. The boss 932 of the first clamp arm defines a lever slot 934 through the middle of the boss 932 to form two approximately equally thick lever retaining sections 936. A lever retaining hole (not shown) is defined in each of the lever retaining section 936. The second end portion 924 of the second clamp arm 904 has a radially extending boss 938. The boss 938 of the second clamp arm defines a latch slot 940 through the middle of the boss to form two approximately equally thick latch retaining sections 942. A latch retaining hole 943 is defined in each of the latching retaining section 942.

The clamp arms 902,904 can be formed from a metallic material or from a polymeric material. Should the clamp arms be formed from a polymeric material, another aspect the present invention is to make the polymeric material conductive. During unloading of dry bulk through the hopper tees and connecting pipes, static electricity may be generated due to the movement of the dry bulk against the interior surfaces of the hopper tees and connecting pipes. Since the dust within the tank car may be combustable, any electrostatic built up in the system must be safely discharged to ground. Often the system is designed such that during the unloading process, the end connection pipe is grounded either through a ground wire or the end connection pipe connected to a grounded tube. However, if the first and second clamp arms are formed of a non-conductive polymeric material, any electrostatic charge built up in the hopper tee is not able to safely discharge through the end connection pipe.

The present invention solves this problem of electrostatic charge built up in the hopper tee by forming the first and clamps arms 902,904 from a conductive polymeric material. The conductive polymeric material includes a structurally suitable polymeric material mixed with a conductive filler. The conductive filler can be carbon powder, carbon fiber, carbon fibril, metal fiber, inherently conductive polymer or inherently dissipative polymer. By forming the clamp arms 902,904 from a conductive polymeric material, any electrostatic charge built up in the hopper tee is able to safely discharge through the conductive clamp arms 902,904, and to the grounded end connection pipe. It is preferable that at least one of the conductive clamp arms 902,904 directly contacts hopper tee and the corresponding connection pipe to electrically connect at least one of the clamp arms to the hopper tee and the corresponding connection pipe upon the clamp assembly in a closed position. Alternative, an additional conductive member, such as a conductive bracket or wire, can be used to electrically connect at least one of the clamping arms to the hopper tee and the corresponding connector pipe upon the clamp assembly in a closed position.

The lever 906 has an attachment portion 944 at one end and a handle 946 at the other end. A pivot hole 948 is defined in the attachment portion 944 of the lever 906. Located radially outwardly of the pivot hole 948 is a catch slot 950. Extending between the surfaces defining the catch slot 950 is a catch pin 952. A section of the attachment portion 944 of the lever 906 is inserted into the lever slot 934 of the first clamp arm 902. A lever pivot pin 954 is inserted through the lever retaining holes of the first clamp arm 902 and the pivot hole 948 of the lever to allow the lever 906 to be pivotably attached to the second end portion 914 of the first clamp arm 902.

The latch 908 has a threaded adjustment portion 956 at one end and a catch 958 at the other end. The adjustment portion 956 is threaded to allow a nut 960 to be adjustably positioned axially along the adjustment portion 956 of the latch 908. A latch pivot pin 962 is inserted through the latch retaining holes 943 of the latch retaining sections 942 of the second end portion 924 of the second clamp arm 904. The latch pivot pin 962 has a bore 963 extending radially through the pin. The adjustment portion 956 of the latch 908 is inserted through the bore 963 of the latch pivot pin 962 and the nut 960 is threaded onto the adjustment portion 956. The catch 958 has a J-shaped hook 964. The inner diameter of the hook 964 is larger than the diameter of the catch pin 952 of lever 906, allowing the hook 964 to surround the catch pin 952.

To close the clamp assembly 900, the hook 964 of the latch 908 is positioned to surround the catch pin 952. The latch 908 is then pivoted towards the first clamp arm 902. Since the catch pin 952 is located radially outwardly of the pivot hole 948, the pivot motion of the latch 908 creates a cammed effect to pull the second end portion 924 of the second clamp arm 904 towards the second end portion 914 of the first clamp arm 902. To assure that an adequate seal is formed between the clamp assembly 900 and the pipes radially inwardly of the clamp assembly, the distance D between the attachment of the latch 908 to the second clamp arm 904 to the attachment of the latch 908 to the lever 906 is adjustable. The adjustment can be performed by moving the nut 906, providing the location of the attachment of the latch 908 to the second clamp arm 904, axially along the adjustment portion 956 of the latch until the desired distance D is achieved.

The clamp assembly for a hopper car is often exposed to the environment for an extended period of time before the clamp assembly is opened. Due to this prolong exposure to the environment, rust may form at the junction of the first clamp arm and the second clamp arm, in particularly at the pivot pin, causing opening the clamp assembly to be extremely difficult. The clamp assembly 900 of the present invention addresses this problem by using an oil impregnated bronze pivot pin 930. Alternatively, lubricant can be introduced to the pivot pin 930 through a zerk fitting 966, as illustrated in FIG. 33. The zerk fitting 966 is threaded into a bore 968 defined radially from the pivot pin 930.

Figure 32:
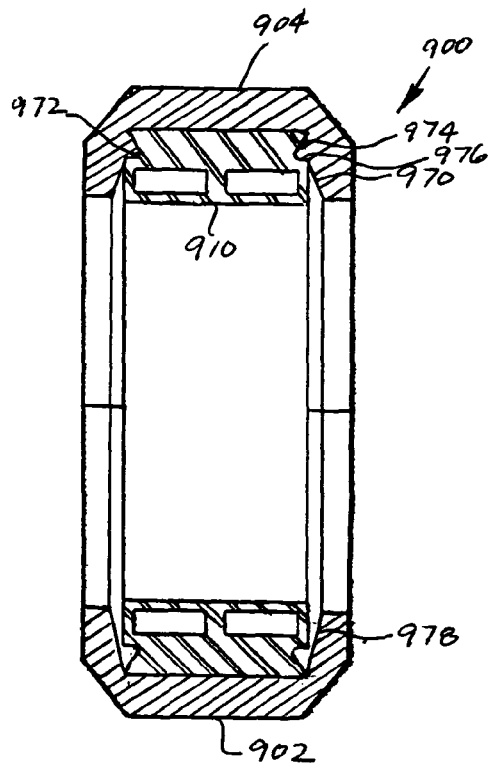
FIG. 32 is a sectional view of the clamp assembly of FIG. 30, as taken along line 32—32.

As illustrated in FIG. 32, the second clamp arm 904 has a groove 970 defined at the radially inner surface. A ridge 972 extends axially inwardly from each of the side wall defining the groove 970. The ridge 972 has a tapered radially outwardly surface 974 and a flat radially inwardly surface 976. The ridges 972 extend along the entire second clamp arm 904. The first clamp arm 902 also has a groove 978 defined at the radially inner surface. However, as evident from FIG. 32, the shape of the cross section of the first clamp arm 902 is different from the shape of cross section of the second clamp arm 904. In particularly, the first clamp arm 902 does not have any ridges extending axially inwardly from the side walls defining the groove 978.

The gasket 910 is seated within the groove 978 defined in the first clamp arm 902 and the groove 970 defined in the second clamp arm 904. As opposed to the prior art gaskets molded as a continuous uninterrupted circular ring, the gasket 910 of the present invention is formed from a straight stock. By forming the gasket 910 from a straight stock, the gasket can be formed by molding or extruding a long continuous stock and then cut to the desired length. The length L of the gasket 910 should be approximately equal to the circumference of the grooves 978,970 of the first and second clamp arms 902,904 upon the clamp assembly 900 in the closed position.

FIGS. 31–32 and 34–35 illustrate a first embodiment of a gasket 910 in accordance to the present invention. The gasket 910 has a sealing surface 980 and a dove-tail shaped base 982. Two rectangular shaped bores 984 are defined in gasket 910 and extend axially along the gasket 910. The bores 984 allow the gasket 910 to be compressed more easily. The sealing surface 980 has a flat surface. The dove-tail shaped base 982 has a narrow portion 986 and a tapered wide portion 988. The dove-tail shaped base 982 is shaped to match the tapered radially outwardly surface 974 of the ridges 972 of the second clamp arm 904. In the installed position, the dove-tail shaped base 982 is retained within the groove 970 of the second clamp arm 904 by the ridges 972 of the second clamp arm 904. Hence, the gasket 910 is secured to the second clamp arm 904 preventing the gasket 910 from moving out of the groove 970 in the radial direction when the clamp assembly 900 in the open position. The dove-tail shaped base 982 is seated within the groove 978 of the first clamp arm 902. However, since the groove 978 of the first clamp arm 902 does not have any ridges 972 extending axially inwardly from the side walls defining the groove 978, the gasket 910 is not retained within groove 978. Thus, the gasket 910 is not secured to the first clamp arm 902 allowing the gasket 910 to move out of the groove 978 in the radial direction relative to the first clamp arm 902 when the clamp assembly 900 in the opened position. By having gasket 910 secured to the second clamp arm 904 and unsecured the first clamp arm 902, the gasket 910 is able to move freely during the opening process to prevent the gasket from tearing, but is still retained to the remainder of the clamp assembly. It should be noted that while the illustrated embodiment discloses the gasket 910 secured to the second clamp arm 904 and unsecured to the first clamp arm 902; the ridges 972 can be formed in the groove 978 of the first clamp arm 902 and not be formed in the groove 970 of the second clamp arm 904, thus, allowing the gasket 910 to be secured to the first clamp arm 902 and unsecured to the second clamp arm 904.

Figure 36:
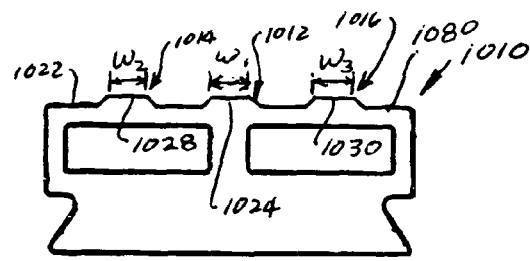
FIG. 36 is a front view of a second embodiment of a gasket in accordance to the present invention.

FIG. 36 illustrates a second embodiment of a gasket 1010 in accordance the present invention. The gasket 1010 is similar to the gasket 910 with the exception of ridges formed on the sealing surface 1080. The sealing surface 1080 of the gasket 1010 has a center ridge 1012 and two outer ridges 1014,1016 extending from the recessed surfaces 1022. The outer ridges 1014,1016 are approximately equally spaced apart from the center ridge 1012. The center ridge 1012 has a flat surface 1024 and tapered surfaces joining the flat surface 1024 to the recessed surfaces 1022. Likewise, each of the two outer ridges 1014,1016 has a flat surface 1028, 1030 and tapered surfaces joining the flat surface 1028,1030 to the recessed surfaces 1022. The flat surface 1024 of the center ridge and the flat surfaces 1028,1030 of the outer ridges are approximately parallel to the recessed surfaces 1022. The widths $W_2, W_3$ of the flat surfaces 1028,1030 of each of the two outer ridges 1014,1016 are approximately the same. The width $W_1$ of the flat surface 1024 of the center ridge 1012 is approximately the same as the widths $W_2, W_3$ of the flat surfaces 1028,1030 of the two outer ridges 1014,1016.

Figure 37:
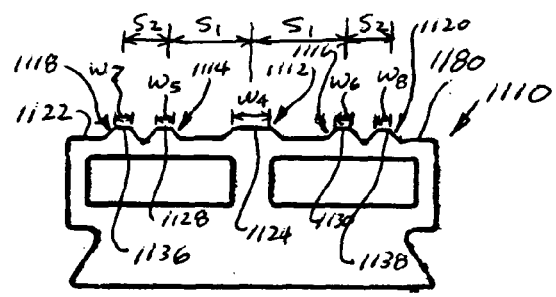
FIG. 37 is a front view of a third embodiment of a gasket in accordance to the present invention.
Figure 34:
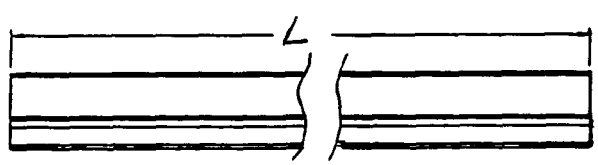
FIG. 34 is a side view of the gasket of FIG. 32, prior to installation to the clamp arms.
Figure 35:
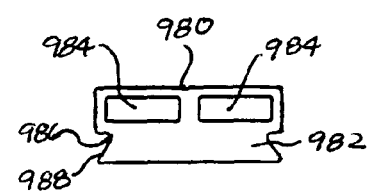
FIG. 35 is a front view of the gasket of FIG. 34.

FIG. 37 illustrates a third embodiment of a gasket 1110 in accordance the present invention. The gasket 1110 is similar to the gasket 910 with the exception of ridges formed on the sealing surface 1180. The sealing surface 1180 of the gasket 1110 has a center ridge 1112 and two sets of outer ridges 1114,1116,1118,1120 extending from the recessed surfaces 1122. The first set of outer ridges 1114,1116 are approximately equally spaced apart from the center ridge 1112. The second set of outer ridges 1118,1120 are approximately equally spaced apart from the first set of outer ridges 1114,1116. The spacing $S_1$ from the first set outer ridges 1114,1116 to the center ridge 1112 is greater than the spacing $S_2$ from the second set of outer ridges 1118,1120 to the first set of outer ridges 1114,1116. The center ridge 1112 has a flat surface 1124 and tapered surfaces joining the flat surface 1124 to the recessed surfaces 1122. Each of the first set of outer ridges 1114,1116 has a flat surface 1128,1130 and tapered surfaces joining the flat surface 1128,1130 to the recessed surfaces 1122. Similarly, each of the second set of outer ridges 1118,1120 has a flat surface 1136,1138 and tapered surfaces joining the flat surface 1136,1138 to the recessed surfaces 1122. The flat surface 1124 of the center ridge, the flat surfaces 1128,1130 of the first set of outer ridges, and the flat surfaces of the second set of outer ridges 1136,1138 are approximately parallel to the recessed surfaces 1122. The widths $W_5, W_6$ of the flat surfaces 1128,1130 of each of the first set of outer ridges 1114,1116 are approximately the same. The widths $W_7, W_8$ of the flat surfaces 1136,1138 of each of the second set of outer ridges 1118, 1120 are approximately the same. Furthermore the widths $W_5, W_6$ of the flat surfaces 1128,1130 of each of the first set of outer ridges 1114,1116 are approximately the same as the widths $W_7, W_8$ of the flat surfaces 1136,1138 of each of the second set of outer ridges 1118,1120. However, the widths $W_5, W_6, W_7, W_8$ of the flat surfaces 1128,1130,1136,1138 of each of the first and second sets of outer ridges 1114,1116, 1118,1120 are smaller than the width $W_4$ of the flat surface 1124 of the center ridge 1112.

It should be noted that while the clamp assembly 900 of the present invention is illustrated in the above embodiments as being adapted for connecting a groove pipe to a groove pipe, the clamp assembly of the present invention can also be adapted to connect a groove pipe to a plane (non-groove) pipe or adapted to connect a plane pipe to a plane pipe. It should also be noted that the while the clamp assembly 900 of the present invention is illustrated in the above embodiments as being adapted for connecting the end of one of the pipe portion of a hopper tee to the end of a connection pipe, the clamp assembly of the present invention can also be adapted to connect the ends of any types of axially aligned pipes.

Various features of the present invention have been described with reference to the above embodiments. It should be understood that modification may be made without departing from the spirit and scope of the invention as represented by the following claims.

The invention claimed is:

1. A swing pipe assembly for pivotably mounting a pipe, adjacent to an axially aligned hopper tee, to a hopper car when a clamp connecting the pipe to the hopper tee has been removed, said swing pipe assembly comprising:
    a hopper tee flange mounted to the hopper car;
    a hopper tee mounted to said flange
    at least one pipe positioned adjacent said hopper tee and moveable relative to said hopper tee
    a pipe retainer attached to said at least one pipe
    at least one mounting bracket mounted to said flange
    a swing arm comprising
    a pivot portion pivotally supported on said at least one bracket an attachment portion attached to said at least one pipe retainer
    and an L-shaped portion between said pivot portion and said attachment portion
    said swing arm moveable between a position with said pipe aligned with said hopper tee to a position wherein said pipe is not aligned with said hopper tee.

2. The swing pipe assembly as claimed in claim 1 wherein said bracket defines a plurality of holes adapted to receive corresponding bolts extending from a flange of the hopper car.

3. The swing pipe assembly as claimed in claim 1 wherein said pipe retainer surrounds the pipe.

4. A swing pipe assembly as claimed in claim 1 wherein said swing hanger includes:
    two pipes each positioned adjacent said hopper tee on opposite sides thereof
    two brackets mounted to said flange with said pivot portion of said swing arm pivotally supported in each of said brackets
    said swing arm including
    two attachment portions, each attached to one of said pipes,
    and an L-shaped portion between said pivot portion and each said attachment portion.

5. A swing pipe assembly as claimed in claim 4 wherein said swing hanger includes a sleeve supported by said brackets and said pivot portion is pivotably supported in said sleeve.

6. A swing pipe assembly as claimed in claim 5 wherein each said bracket includes a vertical attachment portion.

7. A swing hanger assembly for supporting a pipe comprising:
    a swing arm comprising
    a pivot portion
    two attachment portions each adapted for attachment to a pipe
    and an L-shaped portion between each said pivot portion and each said attachment portion
    two spaced mounting brackets with said pivot portion of said swing arm pivotally supported in each of said brackets
    wherein said swing hanger assembly further includes a sleeve supported by said brackets and said pivot portion is pivotably supported in said sleeve.

* * * * *